US011997178B2

(12) United States Patent
Foukas et al.

(10) Patent No.: US 11,997,178 B2
(45) Date of Patent: May 28, 2024

(54) FINE-GRAINED REAL-TIME PRE-EMPTION OF CODELETS BASED ON RUNTIME THRESHOLD

(71) Applicant: Microsoft Technology Licensing, LLC, Redmond, WA (US)

(72) Inventors: Xenofon Foukas, Cambridge (GB); Bozidar Radunovic, Cambridge (GB); Sanjeev Mehrotra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 17/824,662

(22) Filed: May 25, 2022

(65) Prior Publication Data

US 2023/0388393 A1 Nov. 30, 2023

(51) Int. Cl.
| | |
|---|---|
| G06F 9/44 | (2018.01) |
| G06F 9/455 | (2018.01) |
| H04L 67/02 | (2022.01) |
| H04L 67/55 | (2022.01) |

(52) U.S. Cl.
CPC .......... *H04L 67/55* (2022.05); *G06F 9/45558* (2013.01); *H04L 67/02* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 10,754,707 | B2 * | 8/2020 | Tamir | G06F 9/5088 |
| 11,507,353 | B1 * | 11/2022 | Soeters | G06F 8/441 |
| 2014/0115596 | A1 | 4/2014 | Khan et al. | |
| 2019/0324882 | A1 * | 10/2019 | Borello | G06F 8/43 |
| 2020/0174905 | A1 * | 6/2020 | Borello | G06F 8/43 |
| 2021/0004209 | A1 * | 1/2021 | Holt | G06F 8/41 |
| 2023/0176842 | A1 * | 6/2023 | Ammari | G06F 8/41 |
| | | | | 717/140 |

(Continued)

OTHER PUBLICATIONS

Ziv, et al., "An on-line algorithm for checkpoint placement", In Journal of IEEE Transactions on Computers, vol. 46, Issue: 9,, Sep. 1997, pp. 976-985.

(Continued)

*Primary Examiner* — Qamrun Nahar
(74) *Attorney, Agent, or Firm* — ArentFox Schiff LLP

(57) ABSTRACT

Described are examples for providing fine-grained real-time pre-emption of codelets based on a runtime threshold. A controller inserts checkpoints into extended Berkeley packet filter (eBPF) bytecode of a third-party codelet prior to verification of the third-party codelet. A device executes the codelet at a hook point of an application. The inserted checkpoints determine a runtime of the codelet. The device terminates the codelet in response to the runtime exceeding a threshold. The application can be a virtualized radio access network (vRAN) network function and the codelet can control the vRAN function or export network metrics. The application may be executed in a container management system that modifies a container for the application to mount code including a function associated with the hook point of the application to the container; detect an annotation for the container that identifies the codelet; and symbolically links the codelet to the hook point.

22 Claims, 9 Drawing Sheets

(56) References Cited

U.S. PATENT DOCUMENTS

2023/0289193 A1* 9/2023 Guntupalli .............. G06F 8/63
713/2

OTHER PUBLICATIONS

Foukas, et al., "FlexRAN: A Flexible and Programmable Platform for Software-Defined Radio Access Networks", In Proceedings of the 12th International on Conference on emerging Networking Experiments and Technologies, Dec. 2016, pp. 427-441.

Foukas, et al., "Network Slicing in 5G: Survey and Challenges", In Journal of IEEE Communications Magazine, vol. 55, Issue: 5, May 2017, pp. 94-100.

Garcia-Aviles, et al., "Nuberu: Reliable RAN virtualization in shared platforms", In Proceedings of the 27th Annual International Conference on Mobile Computing and Networking, Oct. 2021, pp. 749-761.

Garcia-Saavedra, et al., "ORAN: Disrupting the virtualized RAN ecosystem", In IEEE Communications Standards Magazine, Sep. 2021, 8 Pages.

Gershuni, et al., "Simple and precise static analysis of untrusted linux kernel extensions", In Proceedings of the 40th ACM SIGPLAN Conference on Programming Language Design and Implementation, Jun. 2019, pp. 1069-1084.

Guo, et al., "Enabling 5G RAN Slicing With EDF Slice Scheduling", In Proceedings of IEEE Transactions on Vehicular Technology, vol. 68, Issue: 3, Mar. 2019, pp. 2865-2877.

Haas, et al., "Bringing the web up to speed with webassembly", In Proceedings of the 38th ACM SIGPLAN Conference on Programming Language Design and Implementation, Jun. 2017, pp. 185-200.

Huang, et al., "WebAssembly Micro Runtime", Retrieved from: https://github.com/bytecodealliance/wasm-micro-runtime, May 18, 2022, 11 Pages.

Huynh, et al., "Hidden Linux Metrics with Prometheus eBPF Exporter", Retrieved from: https://www.usenix.org/conference/lisa18/presentation/huynh, Oct. 31, 2018, 4 Pages.

Imtiaz, et al., "Random forests for resource allocation in 5G cloud radio access networks based on position information", In EURASIP Journal on Wireless Communications and Networking, Dec. 2018, 17 Pages.

Johnson, et al., "NexRAN: Closed-loop RAN slicing in POWDER—A top-to-bottom open-source open-RAN use case", In Proceedings of the 15th ACM Workshop on Wireless Network Testbeds, Experimental evaluation & CHaracterization, Jan. 2022, pp. 17-23.

Kotaru, et al., "Spotfi: Decimeter level localization using wifi", In Proceedings of the ACM Conference on Special Interest Group on Data Communication, Aug. 17, 2015, pp. 269-282.

Kulin, et al., "End-to-End Learning From Spectrum Data: A Deep Learning Approach for Wireless Signal Identification in Spectrum Monitoring Applications", In Journal of IEEE Access vol. 6, Mar. 26, 2018, pp. 18484-18501.

Lehmann, et al., "Everything Old is New Again: Binary Security of WebAssembly", In Proceedings of the 29th USENIX Security Symposium, Aug. 12, 2020, pp. 217-234.

Luo, et al., "Channel State Information Prediction for 5G Wireless Communications: A Deep Learning Approach", In Journal of IEEE Transactions on Network Science and Engineering, vol. 7, Issue: 1, Jan. 2020, pp. 227-236.

Maeng, et al., "Adaptive Dynamic Checkpointing for Safe Efficient Intermittent Computing", In Proceedings of the 13th USENIX Symposium on Operating Systems Design and Implementation, Oct. 8, 2018, pp. 129-144.

Maeng, et al., "Alpaca: Intermittent execution without checkpoints", In Proceedings of the ACM on Programming Languages, vol. 1, Oct. 2017, 30 Pages.

McKenney, et al., "RCU Usage In the Linux Kernel: One Decade Later", In Technical report, Feb. 2013, 15 Pages.

McKenney, et al., "What is RCU, Fundamentally?", In Linux Weekly News, Dec. 2007, 17 Pages.

Mehrabi, et al., "Decision Directed Channel Estimation Based on Deep Neural Network k-Step Predictor for MIMO Communications in 5G", In IEEE Journal on Selected Areas in Communications, vol. 37, Issue: 11, Nov. 2019, pp. 2443-2456.

Mohsin, et al., "On Analyzing Beamforming Implementation in O-RAN 5G", In Journal of Electronics, vol. 10, Issue 17, Sep. 4, 2021, 17 Pages.

Monnet, et al., "Awesome eBPF", Retrieved from: https://github.com/zoidbergwill/awesome-ebpf, Apr. 22, 2022, 22 Pages.

Nikaein, et al., "Mosaic5G: Agile and flexible service platforms for 5G research.", In ACM SIGCOMM Computer Communication Review, vol. 48, Issue 3, Jul. 2018, pp. 29-34.

Nojima, et al., "Resource isolation in RAN part while utilizing ordinary scheduling algorithm for network slicing", In Proceedings of IEEE 87th Vehicular Technology Conference (VTC Spring), Jun. 3, 2018, 5 Pages.

Paoloni, et al., "How to Benchmark Code Execution Times on Intel® IA-32 and IA-64 Instruction Set Architectures", In White Paper of Intel, Sep. 2010, 37 Pages.

Polese, et al., "Machine Learning at the Edge: A Data-Driven Architecture With Applications to 5G Cellular Networks", In Journal of IEEE Transactions on Mobile Computing, vol. 20, Issue: 12, Dec. 1, 2021, pp. 3367-3382.

Ransford, et al., "Mementos: System support for long-running computation on rfid-scale devices", In ACM SIGARCH Computer Architecture News, vol. 39Issue 1, Mar. 5, 2011, pp. 159-170.

Rost, et al., "Opportunistic Hybrid ARQ-Enabler of Centralized-RAN Over Nonideal Backhaul", In Proceedings of IEEE Wireless Communications Letters, vol. 3, Issue 5, Oct. 2014, pp. 481-484.

Roux, Cedric, "T tracer", Retrieved from: https://gitlab.eurecom.fr/oai/openairinterface5g/-/wikis/T, Aug. 14, 2018, 1 Page.

Saija, et al., "A Machine Learning Approach for SNR Prediction in 5G Systems", In Proceedings of IEEE International Conference on Advanced Networks and Telecommunications Systems (ANTS), Dec. 16, 2019, 6 Pages.

Schmidt, et al., "Flexric: an sdk for next-generation sd-rans", In Proceedings of the 17th International Conference on emerging Networking Experiments and Technologies, Dec. 2021, pp. 411-425.

Sen, et al., "You are facing the Mona Lisa: Spot localization using PHY layer information", In Proceedings of the 10th international conference on Mobile systems, applications, and services, Jun. 2012, pp. 183-196.

Skeet, Jon, "protocolbuffers / protobuf", Retrieved from: https://github.com/protocolbuffers/protobuf/blob/fb77cc9d9f066a-8ce4f12e8d5f76188d48101444/benchmarks/google_size.proto, Jun. 26, 2015, 5 Pages.

Strodthoff, et al., "Enhanced machine learning techniques for early HARQ feedback prediction in 5G", In IEEE Journal on Selected Areas in Communications, vol. 37, Issue: 11, Nov. 2019, pp. 2573-2587.

Vieira, et al., "Fast packet processing with ebpf and xdp: Concepts, code, challenges, and applications", In ACM Computing Surveys, vol. 53, No. 1, Feb. 2020, 36 Pages.

Wilhelm, et al., "The worst-case execution-time problem—overview of methods and survey of tools", In Proceedings of ACM Transactions on Embedded Computing Systems (TECS), vol. 7, Issue 3, Apr. 2008, 53 Pages.

Wolf, et al., "Fault Coverage of a Timing and Control Flow Checker for Hard Real-Time Systems", In Proceedings of IEEE 18th International On-Line Testing Symposium (IOLTS), Jun. 27, 2012, pp. 127-129.

Wolf, et al., "Fine-grained timing and control flow error checking for hard real-time task execution", In Proceedings of 7th IEEE International Symposium on Industrial Embedded Systems (SIES'12), Jun. 20, 2012, pp. 257-266.

Yin, et al., "Predicting Channel Quality Indicators for 5G Downlink Scheduling in a Deep Learning Approach", In Repository of arXiv:2008.01000v1, Aug. 3, 2020, 6 Pages.

(56) References Cited

OTHER PUBLICATIONS

Zhang, et al., "Energy-Aware Adaptive Checkpointing in Embedded Real-Time Systems", In Proceedings of Design, Automation and Test in Europe Conference and Exhibition, Mar. 7, 2003, 6 Pages.
Zhang, Qi, "Predicting buffer status report (bsr) for 6g scheduling using machine learning models", In KTH Thesis Report, 2021, 64 Pages.
Zheng, et al., "A modified arima model for cqi prediction in lte-based mobile satellite communications", In Proceedings of IEEE International Conference on Information Science and Technology, Mar. 23, 2012, pp. 822-826.
"Technical Specification Group Services and System Aspects; Telecommunication management; Performance Management (PM); Performance measurements Evolved Universal Terrestrial Radio Access Network", Retrieved from: https://portal.3gpp.org/desktopmodules/Specifications/SpecificationDetails.aspx?specificationId=2011, Dec. 2020, 117 Pages.
"5G FAPI: PHY API specification", Retrieved from: https://www.smallcellforum.org/reports/5g-fapi-phy-api-specification/, Nov. 10, 2021, 2 Pages.
"5G FAPI: PHY API Specification", Retrieved from: http://scf.io/en/documents/222_5G_FAPI_PHY, Nov. 2021, 234 Pages.
"An Assessment of the Effects of Repeaters on Mobile Networks", Retrieved from: https://www.ofcom.org.uk/_data/assets/pdf_file/0017/85004/eeffects_of_repeaters_on_mobile_networks.pdf, Nov. 9, 2015, 57 Pages.
"Cellwize Announces Collaboration to Accelerate Deployment of 5G vRAN Networks With AI", Retrieved from: https://www.sdxcentral.com/articles/press-release/cellwize-announces-collaboration-to-accelerate-deployment-of-5g-vran-networks-with-ai/2021/06/, Jun. 22, 2021, 5 Pages.
"E1 Application Protocol (E1AP)", Retrieved from: https://www.etsi.org/deliver/etsi_ts/138400_138499/138463/15.00.00_60/ts_138463v150000p.pdf, Jul. 2018, 129 Pages.
"EBPF", Retrieved from: https://web.archive.org/web/20220516005958/https://ebpf.io/, May 16, 2022, 6 Pages.
"EBPF-based Networking, Observability, Security", Retrieved from: https://web.archive.org/web/20220517081022/https://cilium.io/, May 17, 2022, 13 Pages.
"Efficient interference hunting", Retrieved from: https://www.rohde-schwarz.com/uk/solutions/aerospace-defense-security/security/spectrum-monitoring/efficient-interference-hunting/huntinginterferences_91389.html, Retrieved Date: Apr. 12, 2022, 11 Pages.
"F1 general aspects and principles", Retrieved from: https://www.etsi.org/deliver/etsi_ts/138400_138499/138470/15.04.00_60/ts_138470v150400p.pdf, Apr. 2019, 14 Pages.
"FlexRAN™ Reference Architecture for Wireless Access", Retrieved from: https://web.archive.org/web/20220225191047/https://www.intel.com/content/www/us/en/developer/topic-technology/edge-5g/tools/flexran.html, Feb. 25, 2022, 8 Pages.
"Intelligent 5G L2 MAC Scheduler", In White Paper of Intel, Feb. 2021, 17 Pages.
"Management and orchestration; 5G performance measurements", Retrieved from: https://www.etsi.org/deliver/etsi_ts/128500_128599/128552/16.06.00_60/ts_128552v160600p.pdf, Aug. 2020, 196 Pages.
"Monitoring & Metrics", Retrieved from: https://web.archive.org/web/20210306081428/https://docs.cilium.io/en/stable/operations/metrics/, Mar. 6, 2021, 16 Pages.
"NG general aspects and principles", Retrieved from: https://www.etsi.org/deliver/etsi_ts/138400_138499/138410/15.00.00_60/ts_138410v150000p.pdf, Jul. 2018, 14 Pages.
"OAI Layer 2 Protocol Stack", Retrieved from: https://www.openairinterface.org/docs/workshop/1stOAINorthAmericaWorkshop/Training/KNOPP-OAI-L2.pdf, Nov. 12, 2018, 37 Pages.
"OpenAirInterface Software Alliance", Retrieved from: https://web.archive.org/web/20220503230132/https://openairinterface.org/about-us/, May 3, 2022, 3 Pages.
"O-RAN Fronthaul Control User and Synchronization Plane Specification v7.0", Retrieved from: https://portal.etsi.org/webapp/WorkProgram/Report_WorkItem.asp?WKI_ID=63967&curItemNr=137&totalNrItems=201&optDisplay=100000&qSORT=TB&qETSI_ALL=&SearchPage=TRUE&qINCLUDE_SUB,_TB=True&qINCLUDE_MOVED_ON=&qEND_CURRENT_STATUS_CODE=11+W1%3BM58&qSTOP_FLG=N&qKEYWORD_BOOLEAN=OR&qCLUSTER_BOOLEAN=OR&qCLUSTER=, Nov. 2021.
"O-RAN Use Cases and Deployment Scenarios", In White Paper of ORAN Alliance., Feb. 2020, 21 Pages.
"Radio Link Control (RLC) protocol specification", Retrieved from: https://www.etsi.org/deliver/etsi_ts/138300_138399/138322/16.01.00_60/ts_138322v160100p.pdf, Jul. 2020, 36 Pages.
"Radio Resource Control (RRC); Protocol specification", Retrieved from: https://www.etsi.org/deliver/etsi_ts/138300_138399/138331/16.01.00_60/ts_138331v160100p.pdf, Jul. 2020, 886 Pages.
"RAN Intelligent Controller Applications (RICAPP)", Retrieved from: https://web.archive.org/web/20220516043047/https://docs.o-ran-sc.org/en/latest/projects.html, May 16, 2022, 6 Pages.
"Smart Edge Open Radio Access Network", Retrieved from: https://smart-edge-open.github.io/ido-specs/doc/reference-architectures/ran/smartedge-open_ran/, Retrieved Date: Apr. 12, 2022, 21 Pages.
"Telefonica views on the design, architecture, and technology of 4G/5G Open RAN networks", In White Paper of Telefonica, Jan. 2021, 15 Pages.
"The LLVM Compiler Infrastructure", Retrieved from: https://llvm.org/, Mar. 25, 2022, 3 Pages.
"UBPF", Retrieved from: https://github.com/iovisor/ubpf, May 19, 2022, 4 Pages.
"Unleash the Speed of 4G and 5G Virtualized Radio Access Networks (vRAN)", In Intel® vRAN Dedicated Accelerator ACC100, May 6, 2022, 2 Pages.
"Userspace RCU", Retrieved from: https://web.archive.org/web/20220516131857/https://liburcu.org/, May 16, 2022, 10 Pages.
"Virtual RAN (vRAN) with Hardware Acceleration", In White Paper of Intel, Jan. 2020, 2 Pages.
"Wireless breakthrough for the Ocado Smart Platform", Retrieved from: https://web.archive.org/web/20220411234306/https://www.cambridgeconsultants.com/case-studies/wireless-breakthrough-ocado-smart-platform, Apr. 11, 2022, 26 Pages.
"Wireless Frameworks", Retrieved from: https://web.archive.org/web/20210420192514/https://capgemini-engineering.com/nl/en/services/next-core/wireless-frameworks/, Apr. 20, 2021, 17 Pages.
"With Vodafone and Partners, Vmware Demonstrates How to Accelerate Innovation in the Ran", Retrieved from: https://www.cohere-tech.com/press-releases/with-vodafone-and-partners-vmware-demonstrates-how-to-accelerate-innovation-in-the-ran, Retrieved Date: Apr. 12, 2022, 7 Pages.
"Xn general aspects and principles", Retrieved from: https://www.etsi.org/deliver/etsi_ts/138400_138499/138420/16.00.00_60/ts_138420v160000p.pdf, Jul. 2020, 18 Pages.
Aimonen, et al., "Nanopb—Protocol Buffers for Embedded Systems", Retrieved from: https://github.com/nanopb/nanopb, Apr. 23, 2022, 6 Pages.
Akhtar, et al., "Machine Learning based Prediction of PMI Report for DL-Precoding in 5G-NR System", In IEEE 4th 5G World Forum (5GWF), Oct. 13, 2021, pp. 105-110.
Akman, et al., "O-RAN Minimum Viable Plan and Acceleration towards Commercialization", In White Paper, Jun. 29, 2021, 26 Pages.
Babrou, et al., "ebpf_exporter", Retrieved from: https://github.com/cloudflare/ebpf_exporter, Oct. 19, 2021, 31 Pages.
Babrou, Ivan, "Introducing ebpf_exporter", Retrieved from: https://blog.cloudflare.com/introducing-ebpf_exporter/, Aug. 24, 2018, 33 Pages.
Balasubramanian, et al., "RIC: A RAN Intelligent Controller Platform for AI-Enabled Cellular Networks", In Journal of IEEE Internet Computing, vol. 25, Issue: 2, Mar. 2021, pp. 7-17.
Balieiro, et al., "A Machine Learning Approach for CQI Feedback Delay in 5G and Beyond 5G Networks", In Proceedings of 30th Wireless and Optical Communications Conference (WOCC), Oct. 7, 2021, 5 Pages.
Bendersky, et al., "pyelftools", Retrieved from: https://github.com/eliben/pyelftools, Feb. 3, 2022, 3 Pages.

(56) References Cited

OTHER PUBLICATIONS

Berardinelli, et al., "Enabling early HARQ feedback in 5G networks", In Proceedings of IEEE 83rd Vehicular Technology Conference (VTC Spring), May 15, 2016, 5 Pages.

Bolton, Mark, "The trouble with illegal mobile repeaters", Retrieved from: https://exchange.telstra.com.au/illegal-mobile-repeaters/, Apr. 13, 2018, 5 Pages.

Bonati, et al., "Intelligence and learning in O-RAN for data-driven NextG cellular networks", In Journal of IEEE Communications Magazine, vol. 59, Issue: 10, Oct. 2021, pp. 21-27.

Bonati, et al., "SCOPE: an open and softwarized prototyping platform for NextG systems", In Proceedings of the 19th Annual International Conference on Mobile Systems, Applications, and Services, Jun. 2021, pp. 415-426.

Brown, Gabriel, "New Transport Network Architectures for 5G Ran", In White Paper of Heavy Reading, 2018, 11 Pages.

Bui, et al., "Data-Driven Evaluation of Anticipatory Networking in LTE Networks", In Proceedings of 29th International Teletraffic Congress (ITC 29), Sep. 4, 2017, pp. 46-54.

Cazorla, et al., "Probabilistic worst-case timing analysis: Taxonomy and comprehensive survey", In ACM Computing Surveys, vol. 52, Issue 1, Feb. 2019, pp. 1-35.

Defosseux, Raphael, "OpenAirKernelMainSetup", Retrieved from: https://gitlab.eurecom.fr/oai/openairinterface5g/-/wikis/OpenAirKernelMainSetup, Apr. 16, 2019, 5 Pages.

Elayoubi, et al., "5G RAN Slicing for Verticals: Enablers and Challenges", In Proceedings of IEEE Communications Magazine, vol. 57, Issue: 1, Jan. 2019, pp. 28-34.

Foukas, et al., "Concordia: teaching the 5G vRAN to share compute", In Proceedings of the ACM SIGCOMM Conference, Aug. 2021, pp. 580-596.

Castro, et al., "CERE: LLVM-Based Codelet Extractor and REplayer for Piecewise Benchmarking and Optimization", In Journal of ACM Transactions on Architecture and Code Optimization, vol. 12, No. 1, Article 6, Publication, Apr. 2015, 28 Pages.

"International Search Report and Written Opinion Issued in PCT Application No. PCT/US2023/012971", dated May 9, 2023, 13 pages.

Popov, Mihail, "Automatic Decomposition of Parallel Programs for Optimization and Performance Prediction", In Doctoral Thesis of Paris-Saclay University, Dec. 8, 2016, 148 Pages.

\* cited by examiner

400 ⤴

```
1  #include "janus_defs.h"
2  #include "ubpf_helper.h"
3  #include "output_msg.pb.h"
4  #include "nfapi_interface.h"                        ⤴ 410
5
6  struct janus_load_map_def SEC("maps") countermap = {
7    .type = JANUS_MAP_TYPE_ARRAY,
8    .key_size = sizeof(uint32_t),
9    .value_size = sizeof(uint32_t),
10   .max_entries = 1,
11 };
12
13 struct janus_load_map_def SEC("maps") outmap = {
14   .type = JANUS_MAP_TYPE_RINGBUF,
15   .max_entries = 1024,
16   .proto_msg_name = "output_msg",
17   .proto_name = "output_msg",
18   .proto_hash = PROTO_OUTPUT_MSG_HASH,
19 };
20
21 SEC("janus_ran_fapi")
22 uint64_t bpf_prog(void *state) {
23   void *c;
24   uint32_t index = 0, counter;
25   nfapi_dl_config_request_pdu_t *p, *pend;
26   output_msg s;
27
28   struct janus_ran_fapi_ctx *ctx =
29     (struct janus_ran_fapi_ctx *)state;
30
31   p = (nfapi_dl_config_request_pdu_t *)ctx->data;
32   pend = (nfapi_dl_config_request_pdu_t *)ctx->data_end;
33
34   if (p + 1 > pend) return 1;
35
36   if (p->ndlsch_pdu > 0) {
37     c = janus_map_lookup_elem(&countermap, &index);
38     if (!c) return 1;
39     counter = (*(int *)c + p->ndlsch_pdu);
40     if (counter == 1000) {
41       s.counter = counter;
42       janus_ringbuf_output(&outmap, &s, sizeof(s));
43       counter = 0;
44     }
45     janus_map_update_elem(&countermap, &index, &counter);
46   }
47   return 0;
48 }
```

Figure 4

FINE-GRAINED REAL-TIME PRE-EMPTION OF CODELETS BASED ON RUNTIME THRESHOLD

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge data center with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various remote units (RU), which can provide at least PHY and/or MAC layers of a base station or other RAN node of the mobile network, can be deployed at edge servers. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the edge data center utilizes generic computing resources, a virtualized RAN may provide scalability and fault tolerance for base station processing. For example, the edge data center may assign a variable number of computing resources (e.g., servers) to perform PHY layer processing for the radio units associated with the edge data center based on a workload. Further, a virtualized RAN may implement multiple layers of RAN processing at a data center, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method including: inserting checkpoints into extended Berkeley packet filter (eBPF) bytecode of a third-party codelet prior to verification of the third-party codelet; executing the third-party codelet at a hook point of an application; determining, by the inserted checkpoints, a runtime of the third-party codelet; and terminating the third-party codelet in response to the runtime exceeding a threshold.

In some aspects, the techniques described herein relate to a method, wherein the application is a virtualized radio access network (vRAN) network function and the codelet is configured to control the vRAN function or export network metrics.

In some aspects, the techniques described herein relate to a method, wherein inserting the checkpoints into the eBPF bytecode includes: adding, at a beginning of the eBPF bytecode, initialization code including a function call to a first function that stores a time that execution of the codelet begins; and adding, at various locations of the eBPF bytecode, checkpoint code including a function call to a second function that compares a time of execution of the second function to the stored time that execution of the codelet began.

In some aspects, the techniques described herein relate to a method, wherein the various locations of the eBPF bytecode include locations: after function calls to functions marked as long-lasting by the application; for each logical path through the codelet, at every N instructions from a last checkpoint along the logical path; and within each cycle of the codelet regardless of a distance from the last checkpoint.

In some aspects, the techniques described herein relate to a method, wherein the initialization code or the checkpoint code is configured to: store a register state to a stack; call the first function or the second function; and restore the register state from the stack.

In some aspects, the techniques described herein relate to a method, wherein the checkpoint code is configured to skip the function call to the second function based on a specified frequency of execution of the checkpoint code.

In some aspects, the techniques described herein relate to a method, wherein inserting the checkpoints into the eBPF bytecode further includes updating jump offsets to account for the inserted checkpoint code.

In some aspects, the techniques described herein relate to a method, further including statically verifying, by the verifier, that the eBPF bytecode including the checkpoints is safe.

In some aspects, the techniques described herein relate to a method, further including modifying the application to include a plurality of hook points including the hook point for the third-party codelet.

In some aspects, the techniques described herein relate to a method, wherein the application is executed in a container of a container orchestration system, further including: mounting code including a function associated with the hook point of the application to the container; detecting an annotation for the container that identifies the third-party codelet during execution of the application; and symbolically linking the third-party codelet indicated by the annotation to the hook point of the application.

In some aspects, the techniques described herein relate to a method, wherein mounting the code including the function includes modifying an entry point of the container to execute a script to dynamically load a library which is capable of executing the codelet at the hook point.

In some aspects, the techniques described herein relate to a method, further including making a location that contains compiled and verified codelets available to the container.

In some aspects, the techniques described herein relate to a method, further including adding a component to the container configured to monitor whether to execute a codelet at the hook point and select which codelet to execute at the hook point.

In some aspects, the techniques described herein relate to a system for injection of telemetry collection capability into running applications on a container orchestration system, including: an application programming interface (API) server configured to: receive a user configuration of a container image for the application, the user configuration including a header indicating dynamic loading of codelets, and receive a config map for a codelet while the application is executing in a main container; a mutating webhook configured to modify the user configuration in response to the header to: add a sidecar container to run alongside the main container for the container image, mount one or more libraries into the main container, wherein the one or more libraries define functions associated with hook points within the application, modify an entry point for the main container to run a script that loads the one or more libraries, and mount a directory for compiled and verified codelets into the main container; a node agent configured to: monitor the API server for the config map, compile and verify the codelet, and place the codelet in the directory; and a controller configured to: receive annotations to the user configuration via the API server, wherein the sidecar container is configured to symbolically link the codelet to a hook point within the application based on the annotation.

In some aspects, the techniques described herein relate to a system, wherein the node agent is configured to insert checkpoints into bytecode of the codelet prior to verification, wherein the main container is configured to: execute the codelet at the hook point of the application, determining, by the inserted checkpoints, a runtime of the codelet, and terminate the codelet in response to the runtime exceeding a threshold.

In some aspects, the techniques described herein relate to a system, wherein the application is a vRAN network function and the codelet is configured to control the vRAN function or export network metrics.

In some aspects, the techniques described herein relate to a system, wherein to insert the checkpoints into the bytecode, the node agent is configured to: add, at a beginning of the bytecode, initialization code including a function call to a first function that stores a time that execution of the codelet begins; and add, at various locations of the bytecode, checkpoint code including a function call to a second function that compares a time of execution of the second function to the stored time that execution of the codelet began.

In some aspects, the techniques described herein relate to a system, wherein the various locations of the bytecode include locations: after function calls to functions marked as long-lasting by the application; for each logical path through the codelet, at every N instructions from a last checkpoint along the logical path; and within each cycle of the codelet regardless of a distance from the last checkpoint.

In some aspects, the techniques described herein relate to a system, wherein the initialization code or the checkpoint code is configured to: store a register state to a stack; call the first function or the second function; and restore the register state from the stack.

In some aspects, the techniques described herein relate to a system, wherein the checkpoint code is configured to skip the function call to the second function based on a specified frequency of execution of the checkpoint code.

In some aspects, the techniques described herein relate to a system, wherein the node agent is further configured to update jump offsets to account for the inserted checkpoint code.

In some aspects, the techniques described herein relate to a system, wherein the node agent is further configured to statically verify that the bytecode including the checkpoints includes memory checks, includes only bounded loops, and includes only calls to allowed helper functions.

In some aspects, the techniques described herein relate to an apparatus including: a memory storing computer-executable instructions; and at least one processor configured to execute the instructions to: insert checkpoints eBPF bytecode of a third-party codelet prior to verification of the third-party codelet; and load to third the third-party codelet at a hook point of an application, wherein the codelet is configured to: determine, by the inserted checkpoints, a runtime of the third-party codelet; and terminate the third-party codelet in response to the runtime exceeding a threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is an example code listing for a codelet that may be executed in a vRAN using the example doorway system.

DETAILED DESCRIPTION

Figure 1:
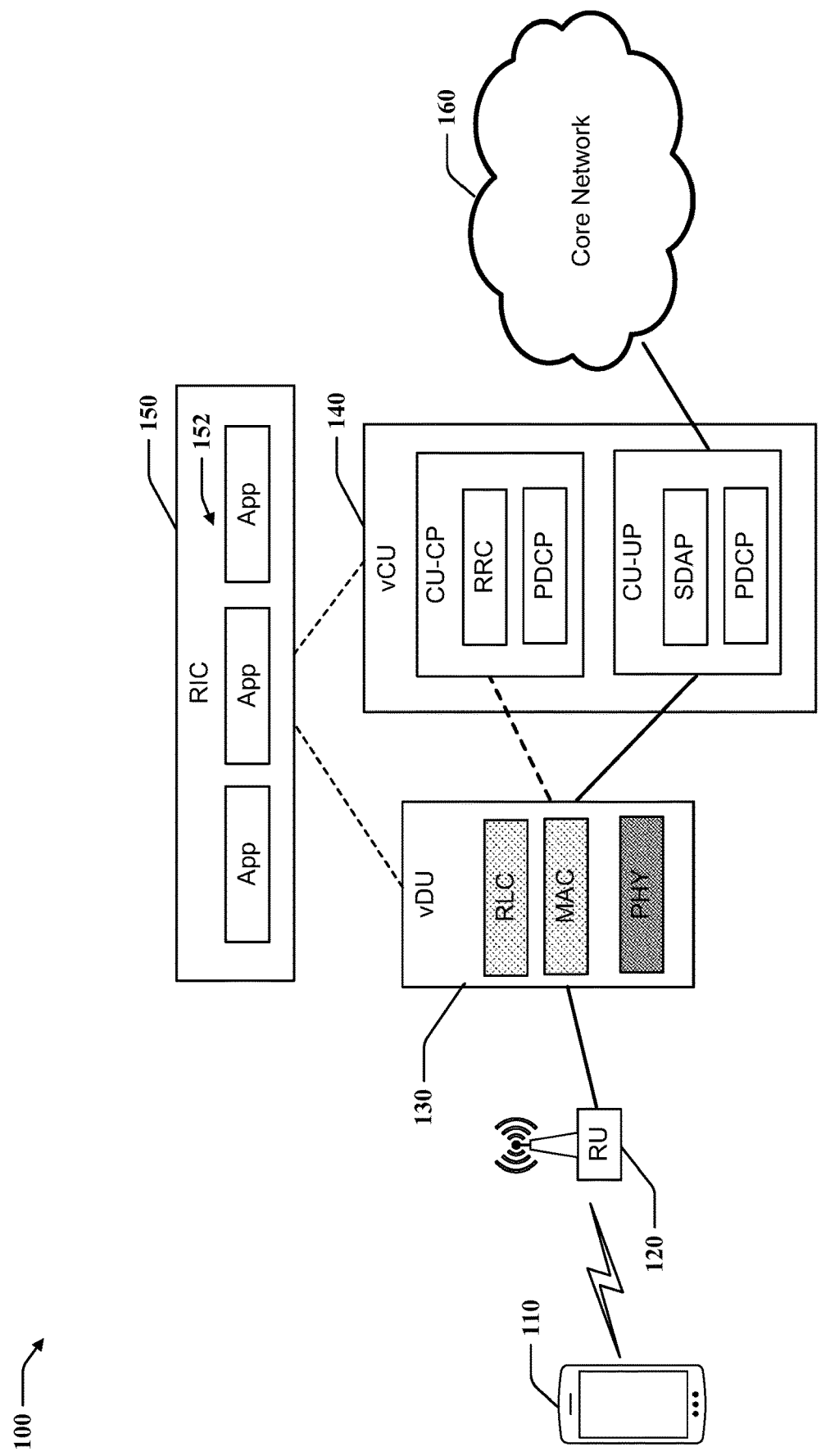
FIG. 1 is a diagram of an example virtualized radio access network (vRAN) connecting a user equipment (UE) to a core network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to using codelets for analytics and control. In particular, the codelets may be limited to a runtime threshold that may be set at a microsecond level to provide fine-grained, real-time, preemption of the codelet. For example, such preemption may be useful in a real-time environment such as a virtualized radio access network (vRAN) with tight timing controls for network functions. Any system with real-time requirements that loads codelets can benefit from fine-grained preemption of codelets using the techniques described herein. For instance, codelets executed within a Linux kernel could make use of preemption to meet timing requirements.

A key transformation of the Radio Access Network (RAN) in 5G is the migration to an Open RAN architecture, that sees the 5G RAN virtualized and disaggregated across multiple open interfaces. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

Despite this compelling vision, the opportunity for innovation still largely remains untapped because of two main challenges. The first challenge is related to the flexible data collection for monitoring and telemetry applications. The RAN functions can generate huge volumes of telemetry data at a high frequency (e.g., gigabytes per second). Collecting, transferring, and processing this data can put a strain on compute and network capacity. A conventional approach, standardized by the $3^{rd}$ generation partnership project (3GPP), defines a small set of aggregate cell key performance indicators (KPIs) collected every few seconds or minutes. The O-RAN RIC extends this idea by providing new KPIs at a finer time granularity. Each KPI is defined through a service model (a form of API), most of them standardized by O-RAN. However, this approach is slow to evolve and does not scale well because of a limited number of initial use cases and a need to standardize new proposals. The second challenge is due to the real-time nature of many RAN control and data plane operations. Any new functionality added to these operations, in order to support a new service model, must be completed within a deadline, typically ranging from nanoseconds (μs) to a few milliseconds (ms). A deadline violation may cause performance degradation or even crash a vRAN. Any changes on these critical paths can create substantial design challenges and make RAN vendors reluctant to add new features In an aspect, the present disclosure describes a system that provides dynamic monitoring and control of vRAN functionality through a provably safe execution environment. The system may provide access and security for the execution environment and may be referred to as a doorway system. The system extends the RIC concept by allowing vRAN operators to write their own monitoring and control code without any assistance from vendors. The monitoring and control code referred to as codelets can be deployed at runtime at different vRAN components without disrupting the vRAN operation. The codelets are typically executed inline and on vRAN critical paths, thus the codelets can get direct access to all important internal vRAN data structures and can collect arbitrary statistics. Existing and new O-RAN service models can be implemented as codelets, and codelets can be used to implement fast control operations such as radio resource allocation. The codelet model may be extended to other computing environments. For example, codelets may be useful in industrial automation or robotics control where tight timing requirements are also present. In an aspect, codelets may be deployed into an application for performing a workload via a container orchestration system that loads codelets into the container and symbolically links the codelets to hook points within the application.

In order to provide the above functionality, the system is designed with a particular focus on safety, efficiency, and flexibility. The system makes use of extended Berkeley packet filter (eBPF) technology, which solves a similar problem in the Linux kernel. The Linux community has observed that pre-defined kernel APIs limit its observability and controllability. To that end, eBPF is developed as a sandboxed execution environment, in which a system operator can deploy custom code that can access and modify selected kernel structures. Prior to loading a codelet, the eBPF execution environment statically verifies it and only allows safe codelets to run. eBPF has created a proliferation of novel applications at various levels of the Linux kernel.

The doorway system strives to achieve a similar goal in the RAN space and other environments. The doorway system builds on a user space implementation of eBPF, called user-space Berkeley packet filter (uBPF), while leveraging existing tools of the eBPF toolchain such as a compiler and verifier. At a high level, the doorway system runs codelets inside a uBPF virtual environment inlined in a control and data path of a deployed system (e.g., a vRAN). Two principal sets of challenges are unique for the vRAN.

The first set of challenge is about flexibility. It is unclear how much and which RAN monitoring or control data is required to build useful applications. The system focuses on key locations, interfaces, and abstractions within the standard vRAN architecture that provide rich and diverse data from only a few collection points. The system includes a toolchain that allows developers to define arbitrary output data structures that are shipped to the RIC. These data structures are in contrast to the existing Linux output data models that are constrained to specific formats. The doorway system may provide a variety of applications. For example, four classes of applications have been implemented and tested: flexible statistics collection, interference detection, network slicing scheduler, and real-time ML prediction. These classes include 17 applications that add flexibility to the vRAN. These applications (apart from the ones defined in RIC data models) cannot be deployed using the standard O-RAN RIC.

The second set of challenges is about safety. Hard, microsecond (μs)-level execution latency requirements are usually not imposed within the Linux kernel but are important for vRAN operation. In an aspect, the system includes an eBPF patching mechanism that preempts a codelet that exceeds a certain runtime threshold. Furthermore, the doorway system includes a number of features to ensure a lockless and non-preemptable design in the fast path (where the codelets run), minimizing the impact of the system to the performance of the vRAN. The system may also include static verification to cover the newly introduced flexible output data structures.

In an aspect, to enforce the runtime threshold, the system may insert checkpoints into eBPF bytecode of a third-party codelet prior to verification of the third-party codelet. The system may execute the third-party codelet at a hook point of an application. The system may determine, by the inserted checkpoints, a runtime of the third-party codelet. The system may terminate the third party codelet in response to the runtime exceeding a threshold.

In another aspect, the disclosure provides a system for injection of codelets into running applications on a cluster of a container orchestration system. The codelets may provide additional capabilities such as telemetry collection, configuration, or control. The system includes an application programming interface (API) server configured to receive a user configuration of a container image for the application. The user configuration includes a header indicating dynamic loading of codelets. The API service is configured to receive a config map for a codelet while the application is executing in a main container. The system includes a mutating webhook configured to modify the user configuration in response to the header. The mutating webhook may, for example, add a sidecar container to run alongside the main container for the container image, mount one or more libraries into the main container, where the one or more libraries define functions associated with hook points within the application, modify an entry point for the main container to run a script that loads the one or more libraries, or mount a directory for compiled and verified codelets into the main container. The system includes a node agent configured to monitor the API server for the config map, compile and verify the codelet, and place the codelet in the directory. The system includes a controller configured to receive annotations to the user configuration via the API server. The sidecar container is configured to symbolically link the codelet to a hook point within the application based on the annotation.

In an aspect, inserting checkpoints into bytecode of a codelet to monitor runtime of the codelet may ensure safety of a codelet executed within another application by forcing the codelet to stop if the codelet would violate timing requirements of the application. Additionally, placement of the checkpoints within specific locations of the bytecode may provide guarantees that runtime is checked often enough to satisfy timing requirements. Moreover, loading of codelets into hook points of an application via a container management system allows run-time customization of the application and dynamic switching of application behavior. Accordingly, the aspects described herein improve the performance of computer systems including vRAN systems.

Figure 7:
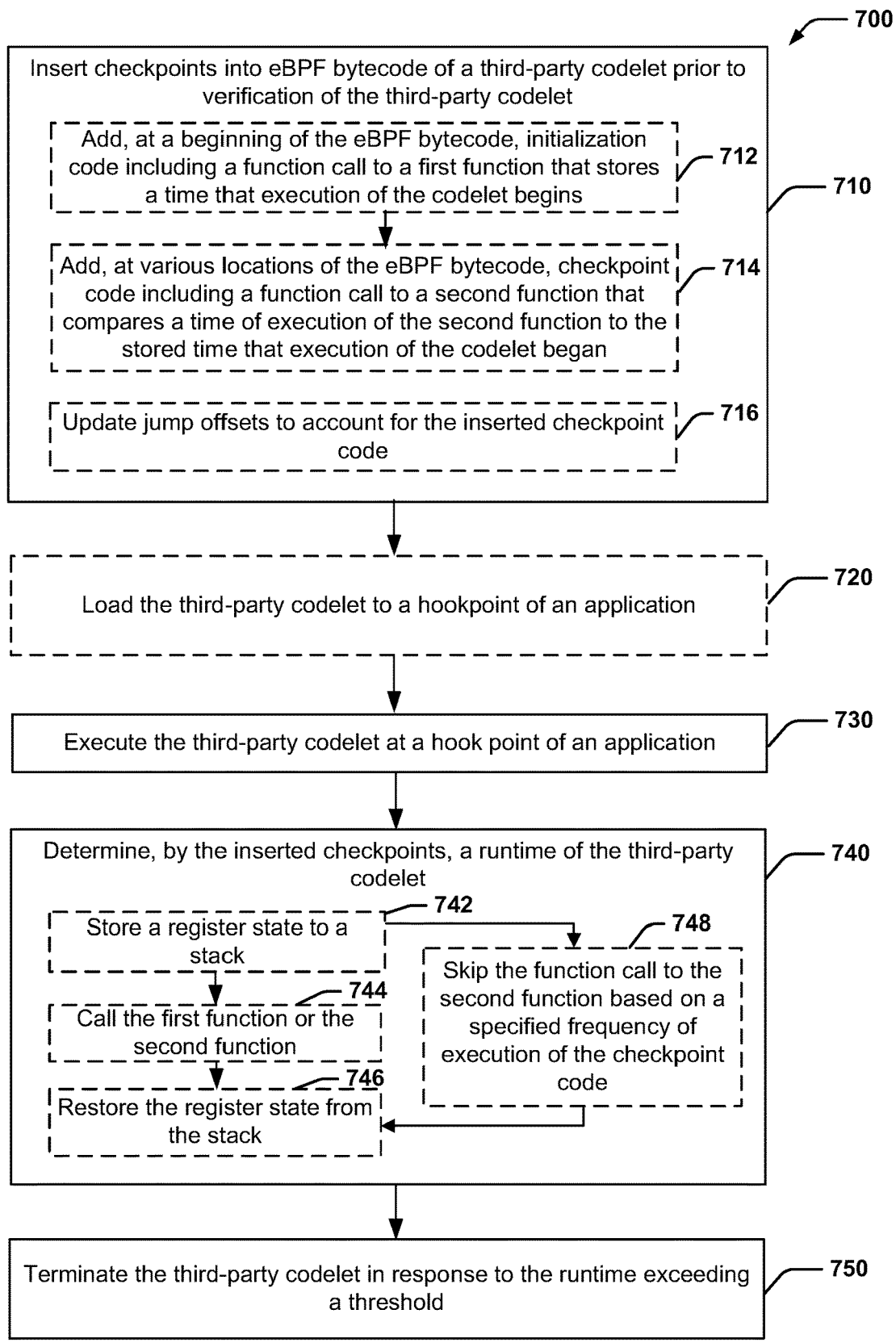
FIG. 7 is a flow diagram of an example of a method for executing codelets within an application.
Figure 8:
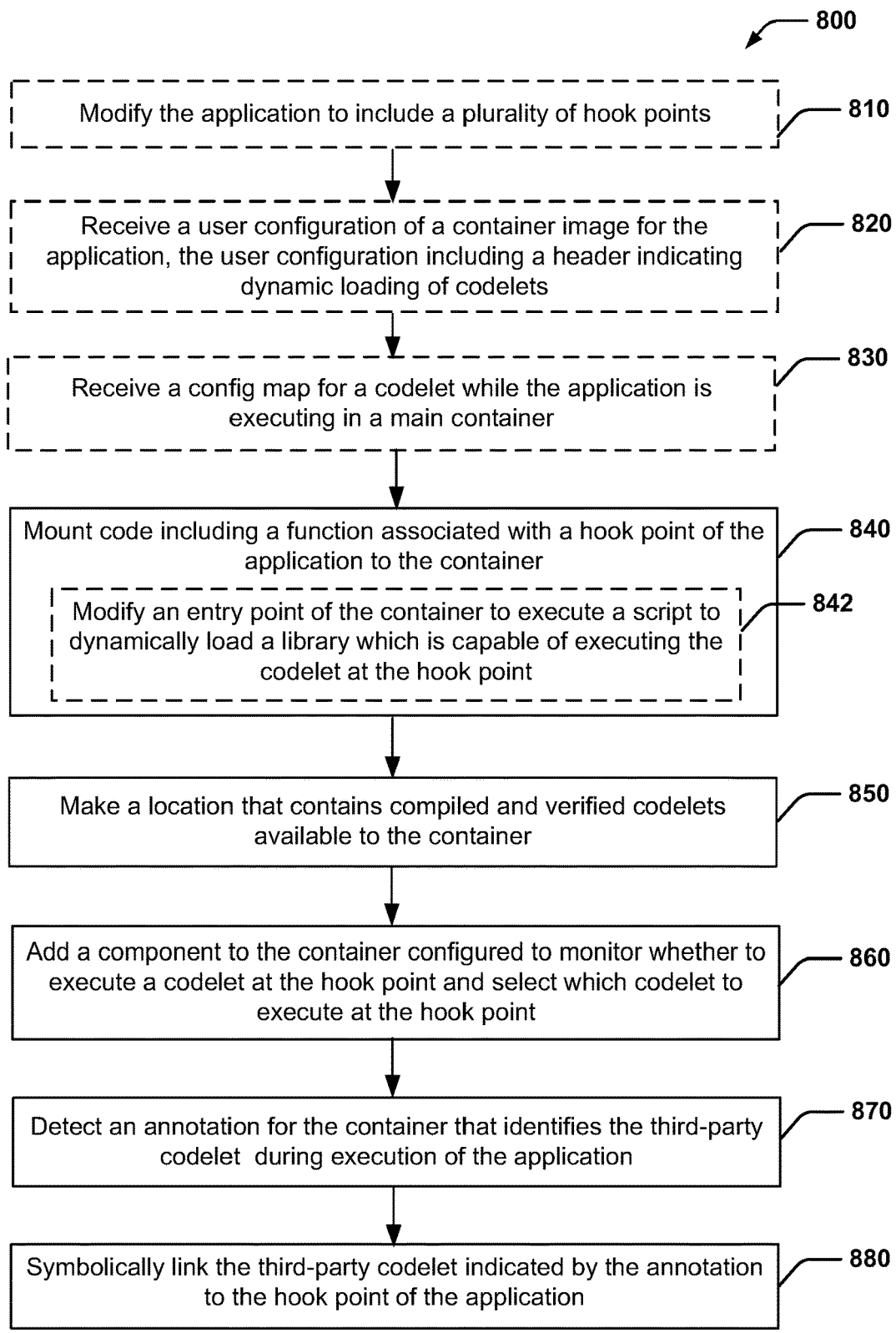
FIG. 8 is a flow diagram of an example of a method for loading codelets into an application executing in a container.

Turning now to FIGS. 1-6, examples are depicted with reference to one or more components and one or more methods that may perform the actions or operations described herein, where components and/or actions/operations in dashed line may be optional. Although the operations described below in FIGS. 7 and 8 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a diagram of an example vRAN 100 connecting a user equipment (UE) 110 to a core network 160. The vRAN 100 may include radio units 120 that transmit and receive wireless signals with the UE 110. The vRAN 100 may include a virtual distributed unit (vDU) 130 that performs processing, for example, at the physical (PHY) layer, media access control (MAC) layer, and radio link control (RLC) layer. The vRAN 100 may include a virtual central unit (vCU) 140 that performs processing at higher layers of the wireless protocol stack. The vRAN 100 may include a RAN intelligent control (RIC) that performs autonomous configuration and optimization of the vRAN 100.

The division of functionality between the vDU 130 and the vCU 140 may depend on a functional split architecture. The vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer. Different components or layers may have different latency and throughput requirements. For example, the PHY layer may have latency requirements between 125 µs and 1 ms and a throughput requirement greater than 1 Gbps, the MAC and RLC layers may have latency requirements between 125 µs and 1 ms and a throughput requirement greater than 100 Mbps, and the higher layers at the vCU may have latency requirements greater than 125 µs and a throughput requirement greater than 100 Mbps.

Programmability in Open RAN components may be facilitated through a near real-time RIC 150. A network operator can install applications (Apps 152, e.g., xApps in Open RAN) on top of the RIC 150, which may collect detailed telemetry and may leverage the telemetry to optimize network performance or report issues in near real-time (e.g., >10 ms to seconds). The data collection and control of the vRAN components may be facilitated through service models that must be embedded in the vRAN functions by vendors. The service models may explicitly define the type and frequency of data reporting for each App 152, as well as a list of control policies that the RIC can use to modify the RAN behavior. Each App 152 may specify its own service model, requiring the collection of different telemetry data.

The initial xApps proposed for standardization by Open RAN focus on optimizing handovers, self-organizing network (SON) functionality, anomaly detection, and coarse grained radio resource allocation. In these use cases, significant network events occur at a low rate (100s of ms to seconds). The volume of generated telemetry data is low, and all the data are transported to the RIC. This allows Apps 152 to have a full insight into the domain and tune the vRAN functions through a pre-determined set of control policies. Unfortunately, this approach does not scale to many other use cases of RAN monitoring and control for two main reasons.

Firstly, for many lower layer applications (e.g., PHY and MAC), it is inefficient to transport all the data to the RIC due to its sheer volume (as shown in FIG. 1). For example, applications like localization, channel estimation, interference detection, and beamforming may require uplink IQ samples from the physical layer. Transporting all IQ samples to the RIC requires more than 5 Gbps per cell for 100 MHz 4×4 MIMO. The standard RIC design overcomes this problem by specifying in the service model of each xApp the data required in terms of type and frequency (e.g., in a raw or a pre-processed format). The form of pre-processing (e.g., sub-sampling, averages, or subsets of data) greatly depends on the service model, posing a serious limitation to interoperability because vRAN vendors must implement and support each proprietary service model.

Secondly, many real-time control loops (e.g., packet scheduling and power control), have very tight time constraints (<10 ms). Such time constraints cannot be met by the standard RIC design that has an expected latency in the order of hundreds of milliseconds. As in the case of telemetry, the xApp choice of control policy is limited by a set of (standardized) policies that the appropriate service model of the RIC provides. vRAN vendors must implement and integrate such algorithms in their stack, while ensuring that they do not affect the run time performance of the vRAN component. This framework of services models implanted by the vRAN vendor makes it very difficult to practically implement new custom variants of tight control loops.

Figure 2:
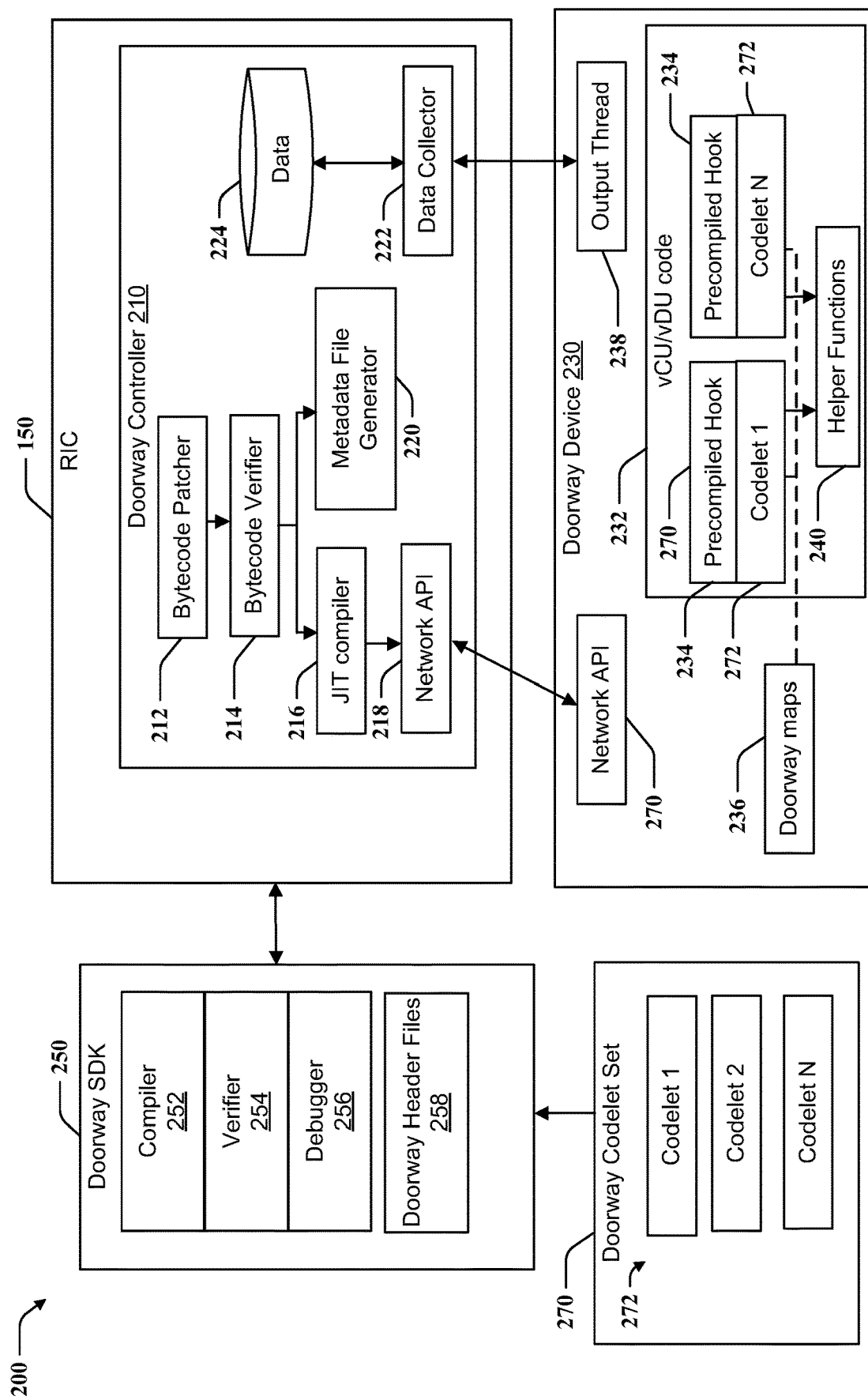
FIG. 2 is a diagram of an example doorway system that provides a code execution framework that allows the safe dynamic loading of custom code in a sandboxed environment at different places in the vRAN.

FIG. 2 is a diagram of an example doorway system 200 that provides a code execution framework that allows the safe dynamic loading of custom code in a sandboxed environment at different places in the vRAN. The doorway system may include a doorway controller 210 that may be implemented at the RIC 150 and a doorway device 230 that may be implemented at a network node such as the vDU 130 or vCU 140.

A doorway device 230 may be any application 232 such as a vRAN component (e.g., a vCU or vDU process) that allows execution of custom code. The doorway system 200 may execute the custom code inside a user mode version of eBPF, called uBPF. An application 232 such as a vRAN component is modified to introduce doorway call points, or hook points 234, at selected places in vRAN functions, at which an eBPF virtual machine (VM) with custom code can be invoked. The invocation is inlined with the vRAN code and gives the VM read-only access to a selected internal vRAN context, which includes, for example, various 3GPP-defined data structure. Table 1, below, provides example hook points in a vRAN.

TABLE 1

| Hook point | vRAN function(s) | Context description |
| --- | --- | --- |
| Raw UL IQ samples | vDU | Capture uplink IQ samples sent by RU to vDU through xRAN 7.2 interface |
| FAPI interface | vDU | Capture scheduling and data plane packets exchanged between MAC and PHY layers |
| RLC | vDU | Capture information about buffers of mobile devices and RLC mode/parameters |
| F1/E1/Ng/Xn interfaces | vCU/vDU | Capture control/data-plane messages exchanged between 3GPP interfaces of vCU/vDU/5G core |
| RRC | vCU | Capture RRC messages exchanged between mobile devices and the base station |

A codelet 272 including custom code can be loaded and unloaded dynamically from a hook point 234 of a doorway device 230, at runtime. In some implementations, the codelet 272 may not affect the performance of the doorway device 230 with respect to performing the vRAN function. For instance, the codelet 272 may merely collect data. In other implementations, the codelet 272 may control the vRAN function (e.g., make scheduling decisions).

A doorway codelet 272 is custom code that can be deployed at a single hook point 234 on a doorway device 230 at runtime. Developers can write codelets 272 in programming languages such as C and compile the codelets into eBPF bytecode using an eBPF compiler 252. Similar to any eBPF program, a doorway codelet 272 must be written in a way that allows the codelet 272 to be statically verifiable (e.g., the code must introduce memory checks and can only have bounded loops). Any operations required by the codelet 272 that could be potentially unsafe (e.g., accessing memory outside of the region the codelet is allowed to access) can only be performed through a set of white-listed helper functions 240 that are deemed safe by the framework. A codelet 272 does not keep any state between two invocations. All state must be stored in an external location called a map 236. For example, a codelet 272 may send its telemetry data through a special map 236 to a doorway output thread 238 running at the doorway device 230, which forwards the telemetry data to the doorway controller 210. In some implementations, the codelet 272 calls a protobuf encoder to write to the special map 236. For each output stream (map of type JANUS_MAP_TYPE_RINGBUF), a single-producer/single-consumer lock-free ring buffer is created to push data out from the codelet to the output thread 238. This ensures that the codelet will never be pre-empted and might only drop excess packets at worst.

A codeletset 270 may refer to an ensemble of coordinated codelets that operate across multiple doorway hook points of a doorway device. Different codelets 272 in a codeletset 270 can coordinate with very low latency through shared maps 236. Codelets across devices can coordinate through the doorway controller 210 if needed.

The doorway controller 210 is responsible for controlling the doorway devices 230 and codeletsets 270. In the context of O-RAN, the doorway controller 210 can be implemented as an App 152 on a RIC 150. Developers may upload codeletsets 270 to the controller 210, with instructions for them to be loaded/unloaded to one or more doorway devices 230. For example, the instructions may be provided to a container orchestration system as described below with respect to FIG. 3. The controller 210 includes a bytecode verifier 214 that verifies safety and termination of each codelet before the controller 210 allows a codeletset 270 to be loaded. For this purpose, an eBPF verifier (such the open-source PREVAIL eBPF verifier) may be extended with verification for doorway helper functions and output schemas. The controller 210 includes a bytecode patcher 212 configured to further modify (or patch) the bytecode of uploaded codelets with additional control code that pre-empts the codelets if the runtime of the codelet exceeds some threshold. The controller 210 includes a just-in-time (JIT) compiler 216 that compiles the patched codelets. The controller 210 includes a network API 218 configured to push the compiled codelets to the doorway devices 230 over the network. The controller 210 may also include a metadata file generator 220 configured to provide meta-data files required for enabling the flexible output of data using protobuf output schemas. The controller 210 may also provide a data collector 222, which collects and deserializes the data 224 sent from the doorway codelets.

The doorway system may also provide a doorway SDK 250 that allows developers to locally test doorway codelets early in the development cycle. The SDK 250 includes a compiler 252, a verifier 254, and a debugger 256, as well as header files 258 including the definitions of all the helper functions and map types that are supported by doorway devices 230.

Doorway codeletsets 270 are JIT-compiled and loaded to doorway devices 230 through the network API 218 provided by the doorway controller 210. Developers can upload the developed codeletsets 270 to the doorway controller 210 and load codeletsets 270 to doorway devices 230 using a tool provided by the doorway SDK 250. The instructions required to upload a codeletset 270 to the doorway controller 210 and load the codeletset 270 to the doorway device 230 are encoded in a descriptor file written in yet-another-markup-language (YAML) format.

At the minimum, the YAML file specifies the names of all the codelets that are part of the codeletset (eBPF byte-code object files in ELF format), the name of the hook in the doorway devices 230 the codelets should be linked to and a calling priority of the codelets. Multiple codelets can be linked to the same hook. The YAML file provides additional optional configuration parameters for further configuring codelets such as, for example, the runtime threshold.

Codelets 272 of the same codeletset 270 can share state and coordinate. This sharing can be particularly useful when performing monitoring or control operations that require the correlation of events and data across different layers of the vRAN stack (e.g., as in the case of interference detection). The sharing of state between codelets of a codeletset is performed using shared maps 236. For this mechanism to work, codelets that want to share state must use the exact same definition for the shared map 236 in terms of its type, key_size, value_size and max_entries, while the name of the map can be different. Developers can then specify the maps to be linked, in the linked_maps section of the YAML descriptor file they use for loading the codeletset 270. When the codeletset 270 is loaded, memory for the shared map 236 is only allocated once on the doorway device 230 and all codelets 272 sharing the map 236 get a pointer to the same memory, which the codelets 272 can then call through helper functions 240 to store and load state.

Figure 3:
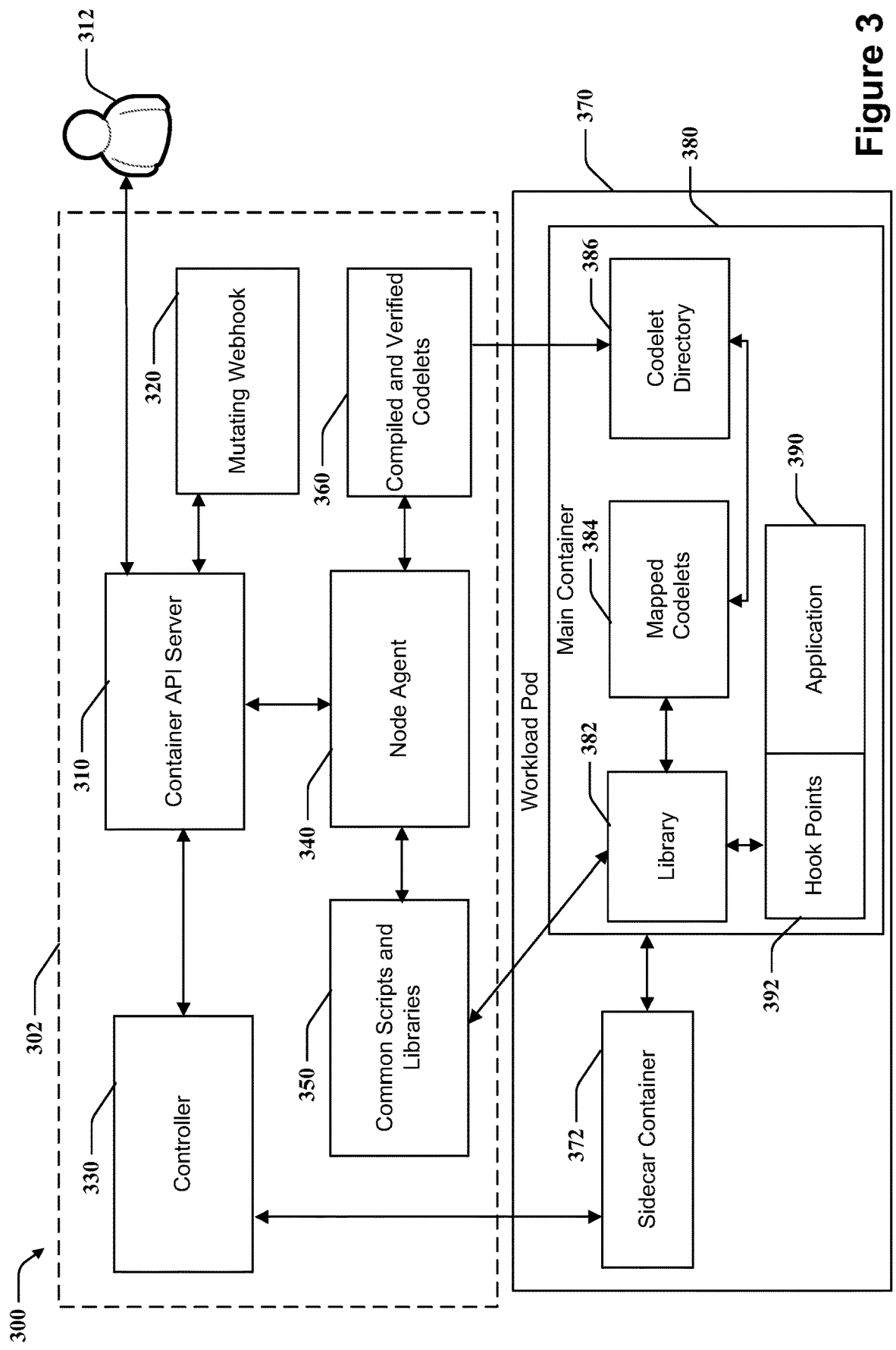
FIG. 3 illustrates an example architecture for loading codelets in a container orchestration system.

FIG. 3 illustrates an example architecture 300 for loading codelets in a container orchestration system 302. For example, the container orchestration system 302 may be a Kubernetes system that executes applications within containers that are grouped into workload pods. In some implementations, the applications may be vRAN functions and a doorway device 230 may be implemented in a container. The architecture 300 includes a container API server 310, a mutating webhook 320, a controller 330, anode agent 340, and a workload pod 370.

The container API server 310 may interact with a user 312 for configuring containers for execution. For example, the user 312 may provide a configuration for a container image. In some implementations, the configuration may be a yet-another-markup-language (YAML) file or JavaScript Object Notation (JSON) file specifying container properties and resources. The configuration may include a header indicating dynamic loading of codelets. The container API server 310 may control the controller 330 and node agent 340 to instantiate a main container 380 within a workload pod 370 and provide resources for the container.

The mutating webhook 320 may include computer-executable code for modifying the user configuration of a container image. For example, the mutating webhook 320 may modify the user configuration to add capabilities for the main container 380 to dynamically load codelets. For instance, the mutating webhook 320 may add a sidecar container 372 to run alongside the main container 380 for the container image (e.g., in the workload pod 370). The mutating webhook 320 may mount one or more libraries 382 into the main container 380. The libraries 382 may define functions associated with hook points 392 within the application 390. The mutating webhook 320 may modify an entry point for the main container to run a script that loads the one or more libraries 382. For example, the script and libraries 382 may be defined by common scripts and libraries 350. The mutating webhook 320 may mount a directory 386 for compiled and verified codelets into the main container.

The node agent 340 may include computer-executable code for dynamically loading codelets into the main container 380. The codelets may be dynamically defined by the user 312 via a config map for a codelet. The container API server 310 may receive the config map while the application 390 is executing in the main container 380. The node agent 340 may monitor the API server 310 for the config map. The node agent 340 may compile and verify the codelet to generate a compiled and verified codelet 360. The node agent 340 may load the compiled and verified codelets 360 into the codelet directory 386.

The controller 330 may include computer-executable code for controlling workload pods 370 and containers including main containers 380 and sidecar containers 372. The controller 330 may receive annotations to the user configuration of a container via the container API server 310. The annotations may associate a codelet with a hook point 392 of the application 390. The controller 330 may provide the annotations to the sidecar container 372. The sidecar container 372 may be configured to symbolically link the codelet indicated by annotation to a hook point 392 within the application 390. For example, the sidecar container 372 may symbolically link the codelet to the function in the library 382 associated with the hook point. Once a compiled and verified codelet 360 that is stored in the codelet directory 386 is symbolically linked to a hook point, the codelet may be considered a mapped codelet 384. When execution of the application 390 reaches a hook point and calls the function in the library 382, the mapped codelet 384 may be executed via the symbolic link. Accordingly, the codelet may be dynamically loaded and executed within the application 390 during execution.

In another implementation, codelets may be dynamically loaded to hook points 234 using a user space implementation of a Read-Copy-Update mechanism (RCU). RCU allows multiple uncoordinated readers to access a shared data structure at the expense of longer write/update times. For example, the readers may be the fast vRAN threads that execute codelets, and the writer is the (non real-time) thread that updates the hook codelet list.

FIG. 4 illustrates an example code listing 400 for a codelet 410 that may be executed in a vRAN using the system 200. In the example code listing, the system 200 and components thereof may be referred to as janus. The doorway system 200 and/or architecture 300 enable new monitoring and control capabilities. The example code listing 400 refers to a codelet developed for the vDU of OAI, which is an open-source implementation of a 4G and 5G vRAN stack. At a high level, the example codelet 410 is invoked by a hook that is introduced at the functional API (FAPI) interface, which is used for the communication of the PHY and MAC layers of the vDU. FAPI packets are C structures, containing information used for the scheduling of radio resources to mobile devices. In the example codelet, a counter maintaining the number of captured FAPI events is sent to the data collector 222 after every 1000 events. While simple, this codelet captures important features that demonstrate the power of the doorway system over the conventional RIC design.

The state argument in line 22 of FIG. 4 is the context (of type janus_ran_fapi_ctx, lines 28-29) that is passed to the function by the vRAN through the hook point 234. The state argument contains a pointer to a FAPI DL Config Request message of type nfapi_dl_config_request_pdu_t, lines 31-32). This message describes a complete scheduling allocation for a particular downlink slot, comprised of more than 20 fields per mobile user, including modulation and coding scheme, transport block size, allocated resource blocks, MIMO layers, etc. The verifier 24 ensures read-only access to the context information to enable safe zero-copy access to an internal vRAN context. Due to the modular vRAN design, there is a small number of similar interfaces specified in different standards (3GPP, Small cell forum) that carry all relevant state across vRAN components. By adding hook points at these interfaces, the doorway controller can give doorway codelet developers access to a large trove of vRAN telemetry. The identified hooks in Table 1 have been implemented. The hooks in Table 1 hooks can be used to enable multiple RIC applications without modifying a single line of code inside the vRAN functions other than addition of the hook points. In some cases, the implementation of an interface may differ across vRAN vendors (e.g., in terms of C struct memory layout). Due to the flexibility of the doorway system, small changes to codelets can be used to adjust to the observed differences while maintaining the same codelet functionality.

Doorway codelets rely on shared memory regions known as maps 236 in eBPF to store state across consecutive invocations, as well as to exchange state with other codelets 272 of the same codeletset 270. The doorway system provides various map types for storing data, including arrays, hashmaps and Bloom Filters. As an example, for the codelet of FIG. 4, the codelet maintains a counter of observed FAPI packets to export to the RIC, instead of exporting the whole raw captured packet. This counter is achieved, by defining an array map (lines 6-11), containing a single element (max_entries). Each time one or more FAPI packets are received, the counter can be restored from memory through a helper function (line 37), incremented with the new number of packets (line 39) and saved again using a helper function (line 45), to be used in the next invocation of the codelet 410. Various safety checks are required to enable static verification (e.g., lines 34 and 38). Furthermore, maps 236 can be shared between codelets 272 in a codeletset 270 to coordinate actions.

In a similar way, doorway codelets can send arbitrary telemetry (e.g., network metrics) data to the data collector 222 using flexible output schemas through a special type of ringbuffer map (JANUS_MAP_TYPE_RINGBUF). This map is linked to a codelet-specific protobuf schema defined by the codelet developer. In the example of listing 400, the definition of the output map can be seen in lines 13-19 for a custom output protobuf schema called output_msg (line 26), with a single counter field (line 41). The data can be exported to the data collector 222 through another helper function 240 (line 42). This flexibility allows implementation of the data models currently available in the O-RAN RIC specs without modifying a single line of code in the vCU 140 and vDU 130, after the hook points 234 are in place.

Verification ensures that a doorway codelet 272 cannot directly modify the state of the vRAN. Instead, modification of the vRAN behavior requires control helper functions 240, provided by the vRAN vendors. The helper functions 240 may be associated with specific hook points 234. The verifier 214 may verify that calls to helper functions are allowed for the associated hook point 234. For example, a vendor may allow a codelet to control scheduling by providing a helper function called allocate_resource_blocks( ) that can only be called at a MAC hook used for radio resource allocation. Similar helper functions can be added for other operations (e.g., handovers, flow prioritization). Although the control helper functions are more dependent on the internal vRAN software architecture, they provide a way for a developer to customize vRAN behavior at runtime.

The doorway system 200 may provide several example classes of applications for various vRAN use cases. In a first example, the doorway system 200 may provide flexible monitoring of a vRAN. As discussed above, the O-RAN RIC 150 allows the collection of telemetry data used for network optimizations through the specification of service models. Each model undergoes a lengthy process of standardization, and subsequently needs to be implemented by each RAN vendor that decides to support it. The doorway system 200 may be used to implement more flexible monitoring without reliance on service models. The doorway system 200 can be used to implement codelets that extract key performance indicators (KPIs) specified in the key performance measurement (KPM) model of O-RAN as well as raw scheduling data. The implementation and collection of these KPIs may be implemented in the system 200 without having to change a single line of code in the vRAN functions that include hook points. Accordingly new data model can be implemented by a developer without a need for further vendor modification of the vRAN function or standardization between vendors. For example, the system 200 can collect the downlink total Physical Resource Block (PRB) usage KPI by tapping into the FAPI hook of Table 1 and capturing the nfapi_dl_config_request_pdu_t struct that was described in listing 400 and which contains the number of PRBs allocated to each user at each scheduling decision. The contents of this struct can be stored in a doorway map 236, averaged over a period of 0.5 ms and sent out to the data collector 222 by a codelet 272.

Another example use case for the system 200 is external interference detection. Detecting external interferers in a cellular network (e.g., repeaters with improperly adjusted gains, spurious emissions of electronics devices, or jammers) is a hard problem that conventionally involves dispatching experts and specialized hardware into the field. A doorway codeletset 270 can define a spectrum analyzer to detect external interference through already deployed and operational 5G radio units (e.g., RUs 120), without a need for a dispatch. The codeletset 270 may include two codelets 272 that use maps for coordination. The first codelet (installed at the FAPI hook of Table 1) detects idle slots when there are no 5G transmissions. The second codelet (installed at the IQ samples hook of Table 1) samples interference during the detected idle slots. The flexibility of the doorway system allows adjustment of the fidelity and overhead of the spectrum analyzer as needed, by specifying a number of parameters in terms of which antenna ports and symbols to collect IQ samples from, with what frequency (e.g., every reception slot or every 10 ms) and with what granularity (e.g., raw IQ samples vs average energy per resource block). A similar approach can be used to implement other use cases that require radio channel telemetry data in a different format (e.g., wireless localization and wireless channel estimation.

Another example use case for the system 200 is network slicing. Many verticals and enterprise applications may rely on network slicing for stricter service QoS guarantees. For example, a robotic warehouse may need very accurate tail communication latency. Existing solutions based on O-RAN service models allow for a set of pre-defined slice scheduling policies that control scheduling at a granularity of 10s of milliseconds. The doorway system 200 may provide realtime slices of arbitrary scheduling policies with a granularity of 0.5-10 ms, faster than the capabilities of standard RIC models. The doorway system 200 can introduce a control hook (slice_scheduler( )) in the beginning of the MAC downlink scheduling function of the vDU 130, which is responsible for the allocation of radio resources to UEs 110. The MAC downlink scheduling function can pass the structure that is used by the MAC scheduler as a hook context. The structure contains the scheduling state of the base station (e.g., number of devices, the slice they belong to, buffer sizes, signal quality, etc.). A helper function 240 (allocate_resource_blocks( )), which is specific to the slice_scheduler( ) hook, may be configured to allow a codelet to modify the allocation of radio resources per slice. Using this hook, a codelet 272 may implement a network slicing scheduler that may be dynamically loaded.

Another example use case for the doorway system 200 is real-time machine-learning prediction. Real-time parameter prediction has been proposed for RAN control loops because the prediction freshness has a direct impact on the network performance. Due to the O-RAN RIC latency, conventional Apps 152 provide predictions that are 10s of milliseconds old. Using the doorway system 200, ML predictor codelets can achieve prediction latency under 10 ms. A first example ML predictor is an autoregressive integrated moving average (ARIMA) time-series model for the prediction of user signal quality. A second example ML predictor is a quantile decision tree for the prediction of signal processing task runtimes. More complex models, such as a Random Forest are more difficult to implement in a doorway codelet using C code, as such complex models result in a large number of bytecode instructions (>100K) making the verification process slow (>20 minutes) and the codelet possibly non-verifiable. In an aspect, the doorway system 200 can support complex ML models in the form of a map 236. A pre-trained serialized complex model can be passed to the doorway system 200 as a config map and linked to the defined map during codelet loading. The doorway system 200 may parse the serialized model and reconstruct the model in memory. The model can then be accessed by the codelet for inference using a helper function 240 (e.g., janus_model_predict( )). This approach can be extended to other commonly used ML models (e.g., Long Short Term Memory (LSTM) networks).

In an aspect, the use of codelets presents an additional technical problem of potentially affecting a runtime of the host application. For example, running codelets inside a vRAN may require guaranteed memory safety and bounded runtime. An eBPF verifier can assert memory safety and termination. That is, if a codelet does not provably terminate (e.g., due to unbounded loops), the codelet is rejected by the verifier. However, existing verifiers do not give sufficiently tight guarantees on the codelet worst-case execution time. This is important for the vRAN which is very sensitive to any jitter.

One simple approach to estimating the worst-case execution time is to analyze the maximum number of eBPF instructions that a codelet can execute. This information can be inferred through static analysis for a longest path of the codelet, taking into account bounded loops. However, translating the number of instructions into the expected runtime may be difficult, as the actual runtime can depend on a number of factors, including the CPU clock, the memory and cache hierarchy, the translation of the eBPF instructions to JIT code, etc. An additional challenge for the doorway system 200 is the helper functions, whose execution time can widely vary between functions and across parameter values. For example, although a helper function may be analyzed as a single instruction, the helper function may perform a more complex operation and incur more significant overhead than several basic instructions indicating that the maximum number of instructions per codelet is not a good proxy of the max runtime.

In an aspect, the doorway system 200 may enforce runtime through bytecode patching. To address the challenges of runtime control, the system 200 includes the bytecode patcher 212 configured to inject additional instructions into the eBPF bytecode that measure the codelet execution time while the codelet is running. The additional instructions preempt the codelet if a threshold is exceeded.

Figure 5:
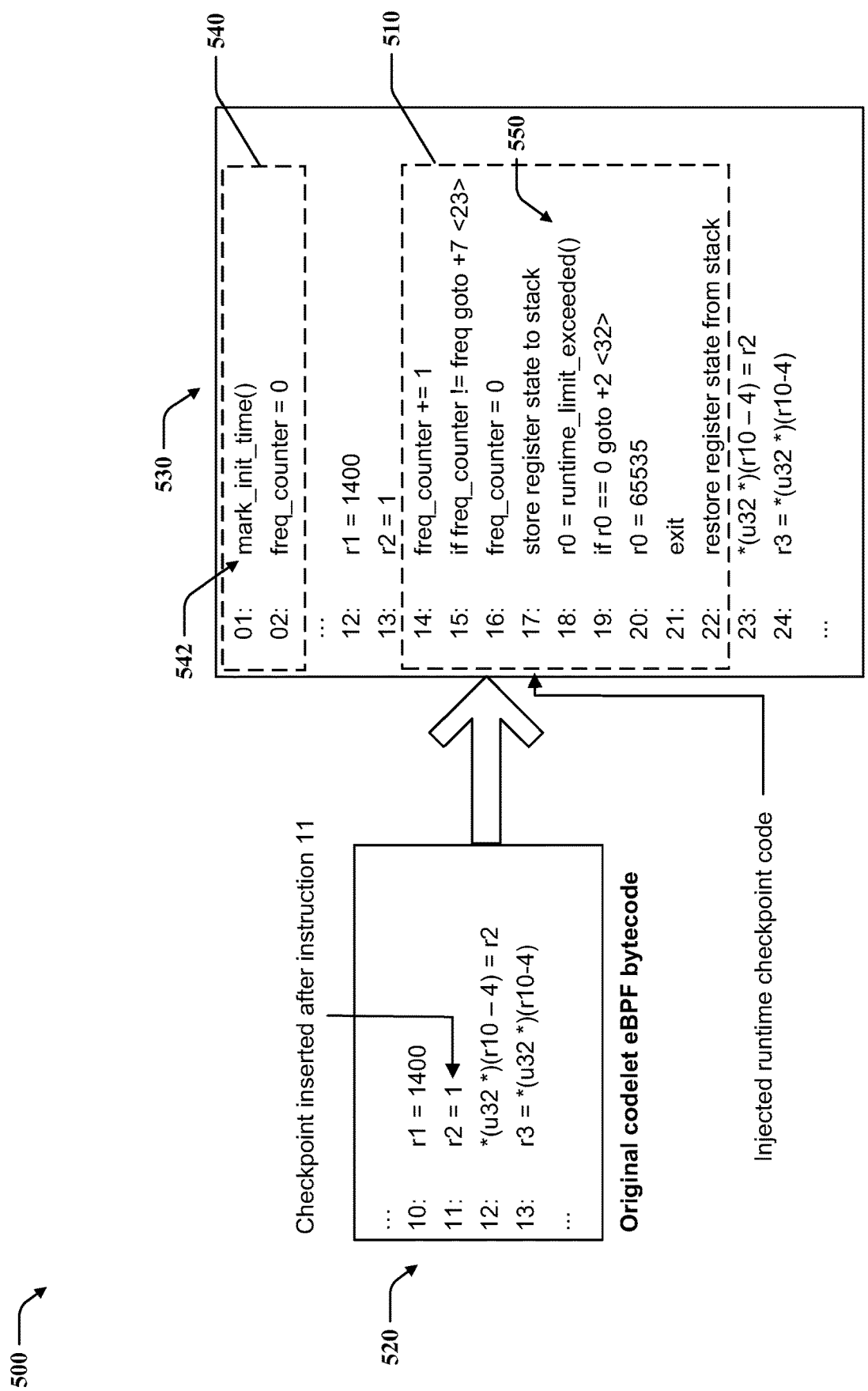
FIG. 5 is a diagram showing patching a checkpoint into a codelet 50 to create a patched codelet.

FIG. 5 is a diagram 500 showing patching a checkpoint 510 into a codelet 520 to create a patched codelet 530. As illustrated in FIG. 5, initialization code 540 including a first helper function 542 (e.g., mark_init_time( )), which stores the current time (using a read time-stamp counter (rdtsc) instruction of a processor) in a thread local variable, is added at the beginning of the patched codelet 530 (e.g., at line 1). The bytecode patcher 212 then introduces checkpoints 510 in selected locations that invoke a second helper function 550 ((e.g., runtime_limit_exceeded( )), which checks the elapsed runtime of the codelet 530 since the first helper function 542 and compares the elapsed runtime against a threshold. If the elapsed runtime exceeds this threshold, the checkpoint 510 forces the codelet to exit and return an error code indicating that the codelet was preempted. The runtime threshold may be specified per codelet during the loading of the codeletset. The patching of checkpoints into codelets approach allows the verifier 214 to verify the bytecode of the patched codelet 530 for safety, which ensures that any modifications made by the patcher 212 do not affect the safety of the loaded codeletset 270.

The time check is implemented as helper functions 542 and 550, because the processor rdtsc instruction may not have a counterpart in the eBPF instruction set. The call to helper function 542 or 550 invalidates eBPF registers r0-r5, which could be storing state from the normal codelet execution flow. The bytecode patcher 212 adds code within the initialization code 540 or checkpoint 510 that stores and reloads the values of those registers (e.g., lines 17 and 22 in FIG. 5), ensuring that the codelet 530 is still verifiable. The bytecode patcher 212 also updates all jump offsets to account for the injected instructions.

A question for the bytecode patcher 212 is where to inject the checkpoints 510. Limiting the maximum number of instructions N between two consecutive checkpoints may reduce the effect of the runtime jitter. However, each checkpoint incurs overhead, including a call to the helper function 550 (line 18 in FIG. 5) to check whether the codelet 530 must be preempted (line 19 in FIG. 5) and saving and restoring the necessary registers (lines 17 and 22 in FIG. 5). The overhead for a checkpoint may be on the order of tens of nanoseconds per checkpoint on currently available processors. To keep the overhead low while limiting the number of instructions N, the bytecode patcher 212 may spread the checkpoints using the greedy algorithm in Algorithm 1, below. Initially, the bytecode patcher 212 adds checkpoints right after the invocation of helper functions that have been marked by the vendor of the application as long lasting and thus potentially unsafe, if used often (line 2). Next, the bytecode patcher 212 uses the static analysis of the verifier 214 to enumerate (from shortest to longest) all the simple paths from the first instruction of the codelet 520 to the last, as well as all the cycles. The static analysis may be, for example, a control flow graph of the codelet 520. For each path, the bytecode patcher 212 adds a checkpoint 510 every N instructions (lines 11-14). The bytecode patcher 212 accounts for checkpoints 510 that have already been added during the traversal of other paths. If a checkpoint 510 is found, the counting of instructions for a new checkpoint is reset, using the existing checkpoint 510 as the starting point (lines 8-9). Finally, at least one checkpoint is added on each cycle even if the distance is smaller than N (lines 17-19). This approach guarantees that a checkpoint 510 can always be reached once every N instructions. For a finer level of control, the bytecode patcher 212 allows RAN vendors to instrument check-points in the source code of their long lasting helper functions 240 using a RUNTIME_LIMIT_EXCEEDED macro, which performs a similar operation as the patch presented in FIG. 5.

---

Algorithm 1: Injection checkpoint decision

---

Data: N > 0, list F of codelet instructions, where long lasting helper
functions are called, ordered list P of all
simple codelet paths from first to last
instruction and cycles (increasing length)
Result: List C of checkpoint instructions positions

```
 1  C ← { };
 2  foreach instruction f in F do C ← C + f;
 3  foreach p in P do
 4  |         ins ← 0;
 5  |         fins ← first instruction of p;
 6  |         foreach instruction i in p do
 7  |         |       ins ← ins + 1;
 8  |         |       if i has already checkpoint then
 9  |         |       |       ins ← 0;
10  |         |       else
11  |         |       |       if ins = N then
12  |         |       |       |       C ← C + i;
13  |         |       |       |       ins ← 0;
14  |         |       |       end
15  |         |       end
16  |         end
17  |         if p is cycle and no checkpoint was added then
18  |         |       C ← C + fins;
19  |         end
20  end
```

---

Even for a few checkpoints, the overhead can become significant (e.g., in codelets with tight loops). To further reduce the overhead, the checkpoint 510 performs checks with a sampling frequency (1 out of M checkpoint hits). The bytecode patcher 212 adds a 32-bit counter in the eBPF stack and performs a check only when this counter reaches some value (line 15 of FIG. 5), otherwise, the execution flow jumps back to the original bytecode instruction. This way, a check is guaranteed to be performed at least once every M*N instructions.

In an aspect, the doorway system 200 allows the definition of arbitrary output schemas for codelets. The schemas are user-defined and loaded with the codelet at runtime. The output data is transmitted over a network to a centralized controller, The doorway system 200 serializes the data using protobufs. However, adding arbitrary schemas can compromise safety. Specifically, the doorway system 200 has to deal with two challenges.

The first challenge is making sure that codelets cannot generate arbitrarily large serializable messages, which could violate memory safety. Protobuf messages are defined by the developer of the codelet and can contain variable size fields (e.g., repeated fields or strings). The verifier 214 is not aware of the actual size of a message at compile time, hence the verifier 214 cannot statically verify message size. To overcome this problem, the system 200 requires an upper bound for all protobuf schemas with variable-sized fields in the message specification. The system 200 allocates the maximum message size for the C representation exposed to the codelet and reports the size to the verifier 214. This allocation size allows for static verification at the expense of slightly increased memory consumption (which is not a bottleneck in a vRAN system).

The second challenge is making sure that an incorrectly formatted message cannot lead to memory violations. Consider a case where codelet is configured to allocate a 30 B memory chunk, cast it as an Example message, set the number of elements to be 16, and call the protobuf encoder. Because the memory chunk is too small for 16 elements, the encoder will attempt to encode from a memory outside the allocated chunk, which may lead to a segfault. To ensure memory access safety, the verifier 214 may be configured to assert that the memory passed to the protobuf encoder is always equal to the maximum possible size. Bugs like the one above will still be functionally incorrect and send garbled data, but do not violate safety.

Figure 6:
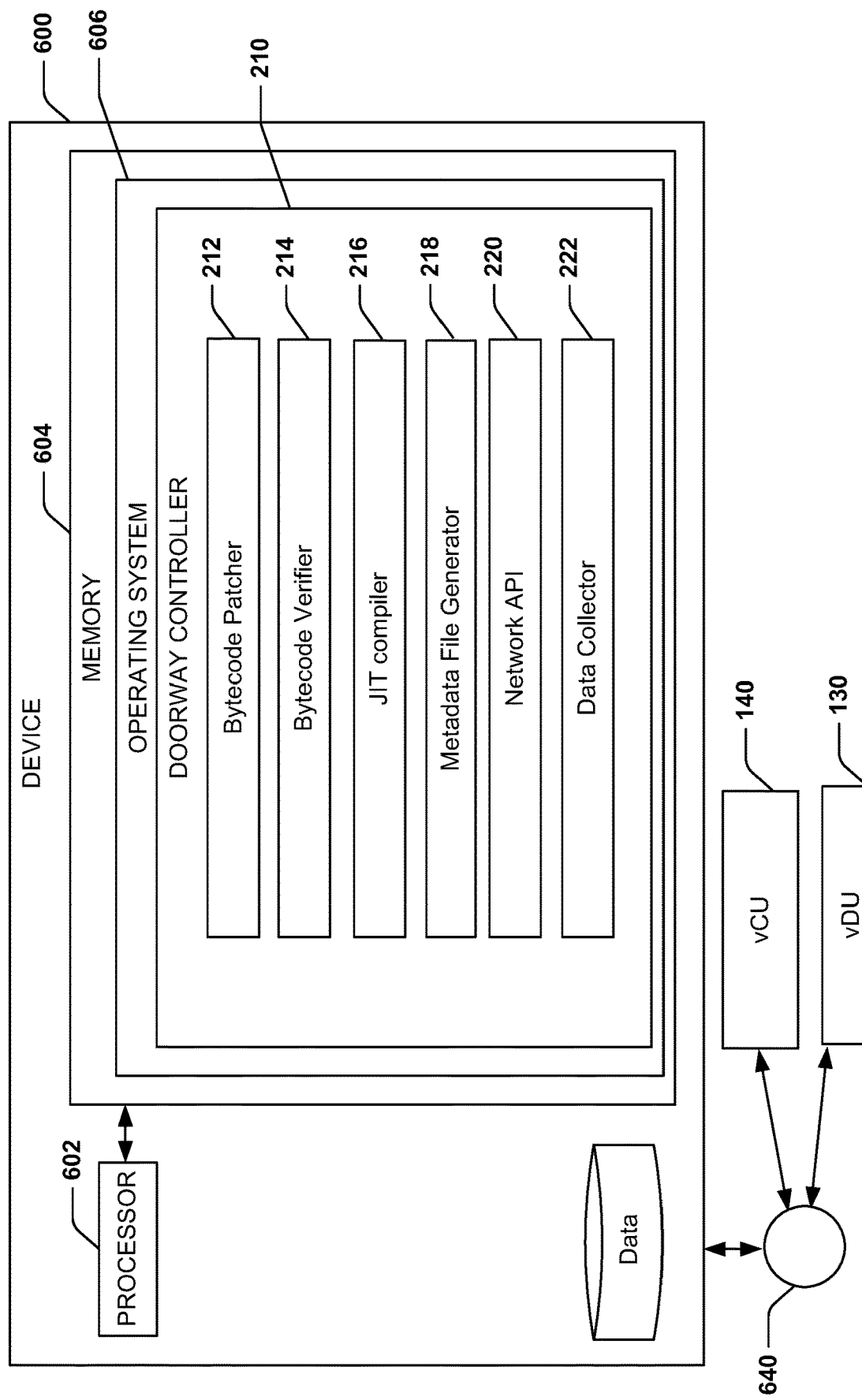
FIG. 6 is a schematic diagram of an example of a device for implementing a doorway controller.

FIG. 6 is a schematic diagram of an example of an apparatus 600 (e.g., a computing device) for implementing a doorway controller 210. The apparatus 600 may be an example of a RIC 150. The apparatus 600 may reside within a data center, which may be an edge data center. The apparatus 600 may be connected to other servers within the data center via the switch 640 and wired connections. For example, apparatus 600 may be connected to doorway device 230 such as a vCU 140 or vDU 130.

In an example, apparatus 600 can include a processor 602 and/or memory 604 configured to execute or store instructions or other parameters related to providing an operating system 606, which can execute one or more applications or processes, such as, but not limited to, the doorway controller 210. For example, processor 602 and memory 604 may be separate components communicatively coupled by a bus (e.g., on a motherboard or other portion of a computing device, on an integrated circuit, such as a system on a chip (SoC), etc.), components integrated within one another (e.g., processor 602 can include the memory 604 as an on-board component), and/or the like. Memory 604 may store instructions, parameters, data structures, etc. for use/execution by processor 602 to perform functions described herein.

In an example, the doorway controller may include one or more of a bytecode patcher 212, a bytecode verifier 214, a JIT compiler 216, a network API 218, a metadata file generator 220, and a data collector 222

FIG. 7 is a flow diagram of an example of a method 700 for executing codelets within an application. For example, the method 700 can be performed by an apparatus 600 and/or one or more components thereof to enforce a runtime threshold on codelets executing within an application.

At block 710, the method 700 includes inserting checkpoints into eBPF bytecode of a third-party codelet prior to verification of the third-party codelet. In an example, the bytecode patcher 212, e.g., in conjunction with processor 602, memory 604, and operating system 606, can insert checkpoints 510 into eBPF bytecode of a third-party codelet 520 prior to verification of the third-party codelet (e.g., patched codelet 530). For instance, the third-party may be a developer that writes the codelet 520 for execution within an application provided by a vendor (second party) and executed by an operator (first party). In some implementations, at sub-block 712, the block 710 may optionally include adding, at a beginning of the eBPF bytecode, initialization code 540 including a function call to a first function (e.g., helper function 542) that stores a time that execution of the codelet 530 begins. At sub-block 714, the block 710 may optionally including adding, at various locations of the eBPF bytecode, checkpoint code (e.g., checkpoint 510) including a function call to a second function 550 that compares a time of execution of the second function to the stored time that execution of the codelet began. At sub-block 716, the block 710 may optionally include updating jump offsets to account for the inserted checkpoint code.

At block 720, the method 700 includes loading the third-party codelet to a hook point of an application. In an example, the network API 218, e.g., in conjunction with processor 602, memory 604, and operating system 606, can load the third-party codelet 272 to a hook point 234 of an application 232. In some implementations, where the application is executed in a container orchestration system, the block 720 may include the method 800 discussed below.

At block 730, the method 700 includes executing the third-party codelet at a hook point of an application. In an example, the doorway device 230, e.g., in conjunction with processor 602, memory 604, and operating system 606, execute the third-party codelet 272 at a hook point 234 of an application 232.

At block 740, the method 700 includes determining, by the inserted checkpoints, a runtime of the third-party codelet. In an example, the doorway device 230 executing the application 232, e.g., in conjunction with processor 602, memory 604, and operating system 606, can determine, by the inserted checkpoints 510, a runtime of the third-party codelet 272. In some implementations, at sub-block 742, the block 740 may optionally include storing a register state to a stack. For example, the initialization code 540 or the checkpoint 510 may store the register state to the stack. At sub-block 744, the block 740 may optionally include calling the first function 542 or the second function 550 (e.g., to compare a current time with a start of execution of the codelet). At sub-block 746, the block 740 may optionally include restoring the register state from the stack. For example, the initialization code 540 or the checkpoint 510 may restore the register state from the stack. In some implementations, at sub-block 748, the block 740 may include skipping the function call to the second function (e.g., sub-block 744) based on a specified frequency of execution of the checkpoint code.

At block 750, the method 700 includes terminating the third party codelet in response to the runtime exceeding a threshold. In an example, the doorway device 230 executing the codelet 272, e.g., in conjunction with processor 602, memory 604, and operating system 606, can terminate the third-party codelet 272 in response to the runtime exceeding a threshold.

FIG. 8 is a flow diagram of an example of a method 800 for loading codelets into an application executing in a container. For example, the method 800 can be performed by an apparatus 600 and/or one or more components thereof to load the codeletset 270 or codelets 272 into the application 232. In some implementations, the method 800 may be used to load codelets into any application executing on a container orchestration system. The method 800 may be performed in conjunction with the method 700. For example, the method 800 may correspond to the block 720.

At block 810, the method 800 optionally includes modifying the application to include a plurality of hook points. In an example, the doorway controller 210 or the container API server 310, e.g., in conjunction with processor 602, memory 604, and operating system 606, can modify the application 390 to include a plurality of hook points 392.

At block 820, the method 800 includes receiving a user configuration of a container image for the application, the user configuration including a header indicating dynamic loading of codelets. In an example, the container API server 310, e.g., in conjunction with processor 602, memory 604, and operating system 606, receive a user configuration of a container image (e.g., a YAML file) for the application 390, the user configuration including a header indicating dynamic loading of codelets.

At block 830, the method 800 includes receiving a config map for a codelet while the application is executing in a main container. In an example, the container API server 310, e.g., in conjunction with processor 602, memory 604, and operating system 606, can receive a config map for a codelet while the application is executing in a main container 380.

At block 840, the method 800 includes mounting code including a function associated with a hook point of the application to the container. In an example, the mutating webhook 320, e.g., in conjunction with processor 602, memory 604, and operating system 606, can mount code including a function (e.g., library 382) associated with a hook point 392 of the application 390 to the container 380.

At block 850, the method 800 includes mounting code including a function associated with a hook point of the application to the container. In an example, the mutating webhook 320, e.g., in conjunction with processor 602, memory 604, and operating system 606, can mount code including a function (e.g., library 382) associated with a hook point 392 of the application 390 to the container 380. For example, at sub-block 842 the mutating webhook 320 may modify an entry point of the container 380 to execute a script to dynamically load the library 382 which is capable of executing the codelet at the hook point 392.

At block 860, the method 800 includes making a location available to the container that contains compiled and verified codelets. In an example, the mutating webhook 320, e.g., in conjunction with processor 602, memory 604, and operating system 606, can make a location (e.g., codelet directory 386) that contains compiled and verified codelets 360 available to the container 380.

At block 870, the method 800 includes detecting an annotation for the container that identifies the third-party codelet during execution of the application. In an example, the controller 330, e.g., in conjunction with processor 602, memory 604, and operating system 606, can detect an annotation for the container that identifies the third-party codelet during execution of the application.

At block 880, the method 800 includes symbolically linking the third-party codelet indicated by the annotation to the hook point of the application. In an example, the sidecar container 372, e.g., in conjunction with processor 602, memory 604, and operating system 606, can symbolically link the third-party codelet indicated by the annotation to the hook point 392 of the application 390.

Figure 9:
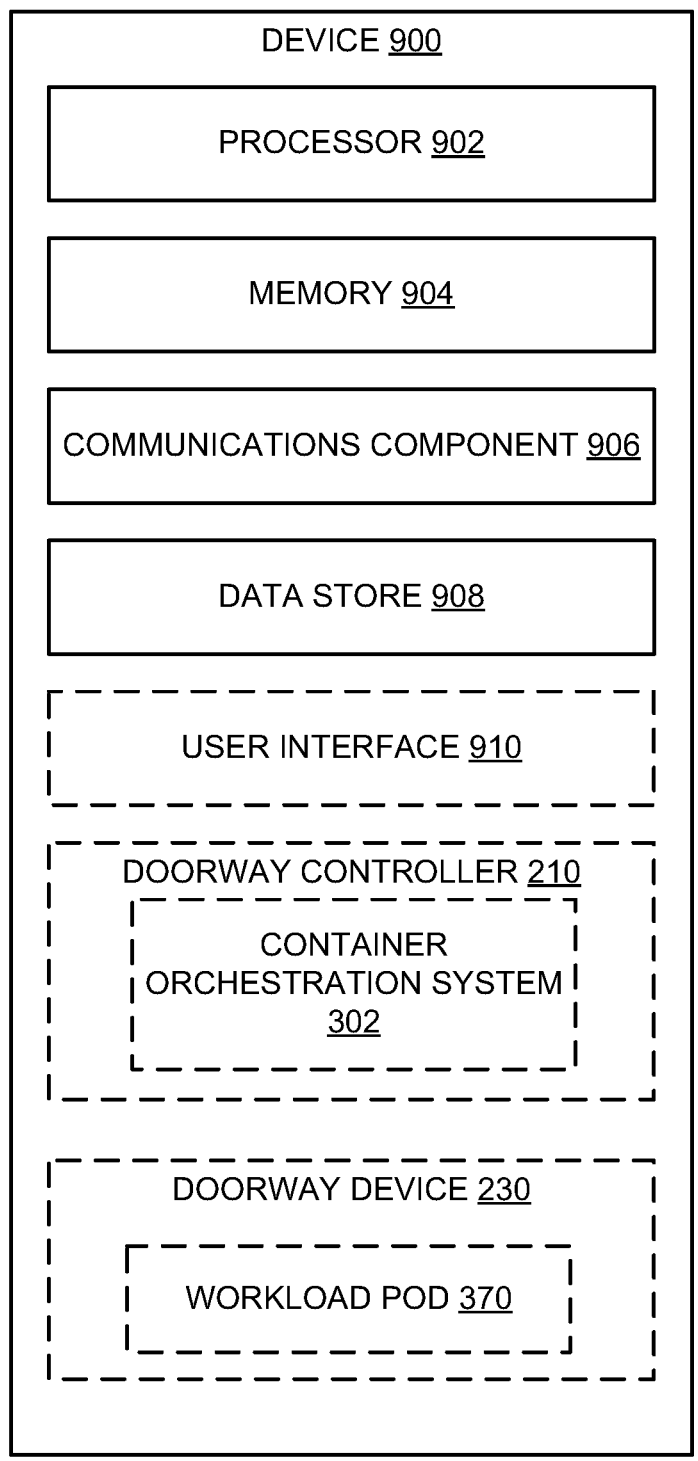
FIG. 9 illustrates an example of a device including additional optional component details as those shown in FIG. 6.

FIG. 9 illustrates an example of a device 900 including additional optional component details as those shown in FIG. 6. In one aspect, device 900 may include processor 902, which may be similar to processor 602 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 may further include memory 904, which may be similar to memory 604 such as for storing local versions of operating systems (or components thereof) and/or applications being executed by processor 902, such as doorway controller 210, doorway device 230, etc. Memory 904 can include a type of memory usable by a computer, such as random access memory (RAM), read only memory (ROM), tapes, magnetic discs, optical discs, volatile memory, non-volatile memory, and any combination thereof.

Further, device 900 may include a communications component 906 that provides for establishing and maintaining communications with one or more other devices, parties, entities, etc. utilizing hardware, software, and services as described herein. Communications component 906 may carry communications between components on device 900, as well as between device 900 and external devices, such as devices located across a communications network and/or devices serially or locally connected to device 900. For example, communications component 906 may include one or more buses, and may further include transmit chain components and receive chain components associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with aspects described herein. For example, data store 908 may be or may include a data repository for operating systems (or components thereof), applications, related parameters, etc. not currently being executed by processor 902. In addition, data store 908 may be a data repository for doorway controller 210, doorway device 230, and/or one or more other components of the device 900.

Device 900 may optionally include a user interface component 910 operable to receive inputs from a user of device 900 and further operable to generate outputs for presentation to the user. User interface component 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof.

Device 900 may additionally include the doorway controller 210 for providing for executing codelets within an application and the doorway device 230 for executing the codelets., as described herein. In some implementations, the doorway controller 210 may be implemented as a container orchestration system 302 and the doorway device 230 may be implemented a workload pod 370.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method comprising:
    inserting checkpoints into extended Berkeley packet filter (eBPF) bytecode of a third-party codelet prior to verification of the third-party codelet, wherein inserting the checkpoints into the eBPF bytecode comprises:
        adding, at a beginning of the eBPF bytecode, initialization code including a function call to a first function that stores a time that execution of the codelet begins; and
        adding, at various locations of the eBPF bytecode, checkpoint code including a function call to a second function that compares a time of execution of the second function to the stored time that execution of the codelet began;
    executing the third-party codelet at a hook point of an application;
    determining, by the inserted checkpoints, a runtime of the third-party codelet; and
    terminating the third-party codelet in response to the runtime exceeding a threshold.

2. The method of claim 1, wherein the application is a virtualized radio access network (vRAN) network function and the codelet is configured to control the vRAN function or export network metrics.

3. The method of claim 1, wherein the various locations of the eBPF bytecode include locations:
  after function calls to functions marked as long-lasting by the application;
  for each logical path through the codelet, at every N instructions from a last checkpoint along the logical path; and
  within each cycle of the codelet regardless of a distance from the last checkpoint.

4. The method of claim 1, wherein the initialization code or the checkpoint code is configured to:
  store a register state to a stack;
  call the first function or the second function; and
  restore the register state from the stack.

5. The method of claim 1, wherein the checkpoint code is configured to skip the function call to the second function based on a specified frequency of execution of the checkpoint code.

6. The method of claim 1, wherein inserting the checkpoints into the eBPF bytecode further comprises updating jump offsets to account for the inserted checkpoint code.

7. The method of claim 1, further comprising statically verifying, by the verifier, that the eBPF bytecode including the checkpoints is safe.

8. The method of claim 1, further comprising modifying the application to include a plurality of hook points including the hook point for the third-party codelet.

9. The method of claim 1, wherein the application is executed in a container of a container orchestration system, further comprising:
  mounting code including a function associated with the hook point of the application to the container;
  detecting an annotation for the container that identities the third-party codelet during execution of the application; and
  symbolically linking the third-party codelet indicated by the annotation to the hook point of the application.

10. The method of claim 9, wherein mounting the code including the function comprises modifying an entry point of the container to execute a script to dynamically load a library which is capable of executing the codelet at the hook point.

11. The method of claim 9, further comprising making a location that contains compiled and verified codelets available to the container.

12. The method of claim 9, further comprising adding a component to the container configured to monitor whether to execute a codelet at the hook point and select which codelet to execute at the hook point.

13. A system for injection of telemetry collection capability into running applications on a container orchestration system, comprising:
  an application programming interface (API) server configured to:
    receive a user configuration of a container image for the application, the user configuration including a header indicating dynamic loading of codelets, and
    receive a config map for a codelet while the application is executing in a main container;
  a mutating webhook configured to modify the user configuration in response to the header to:
    add a sidecar container to run alongside the main container for the container image,
    mount one or more libraries into the main container, wherein the one or more libraries define functions associated with hook points within the application,
    modify an entry point for the main container to run a script that loads the one or more libraries, and
    mount a directory for compiled and verified codelets into the main container;
  a node agent configured to:
    monitor the API server for the config map,
    compile and verify the codelet, and
    place the codelet in the directory; and
  a controller configured to:
    receive annotations to the user configuration via the API server, wherein the sidecar container is configured to symbolically link the codelet to a hook point of the hook points within the application based on the annotation.

14. The system of claim 13, wherein the node agent is configured to insert checkpoints into bytecode of the codelet prior to verification,
  wherein the main container is configured to:
    execute the codelet a the hook point of the application,
    determining, by the inserted checkpoints, a runtime of the codelet, and
    terminate the codelet in response to the runtime exceeding a threshold.

15. The system of claim 14, wherein the application is a virtualized radio access network (vRAN) network function and the codelet is configured to control the vRAN function or export network metrics.

16. The system of claim 12, wherein to insert the checkpoints into the bytecode, the node agent is configured to:
  add, at a beginning of the bytecode, initialization code including a function call to a first function that stores a time that execution of the codelet begins; and
  add, at various locations of the bytecode, checkpoint code including a function call to a second function that compares a time of execution of the second function to the stored time that execution of the codelet began.

17. The system of claim 16, wherein the various locations of the bytecode include locations:
  after function calls to functions marked as long-lasting by the application;
  for each logical path through the codelet, at every N instructions from a last checkpoint along the logical path; and
  within each cycle of the codelet regardless of a distance from the last checkpoint.

18. The system of claim 16, wherein the initialization code or the checkpoint code is configured to:
  store a register state to a stack;
  call the first function or the second function; and
  restore the register state from the stack.

19. The system of claim 6, wherein the checkpoint code is configured to skip the function call to the second function based on a specified frequency of execution of the checkpoint code.

20. The system of claim 16, wherein the node agent is further configured to update jump offsets to account for the inserted checkpoint code.

21. The system of claim 16, wherein the node agent is further configured to statically verify that the bytecode including the checkpoints includes memory checks, includes only bounded loops, and includes only calls to allowed helper functions.

22. An apparatus comprising:
  a memory storing computer-executable instructions; and
  at least one processor configured to execute the instructions to:

insert checkpoints into extended Berkeley packet filter (eBPF) bytecode of a third-party codelet prior to verification of the third-party codelet, wherein to insert the checkpoints into the eBPF bytecode comprises:
  adding, at a beginning of the eBPF bytecode, initialization code including a function call to a first function that stores a time that execution of the codelet begins; and
  adding, at various locations of the eBPF bytecode, checkpoint code including a function call to a second function that compares a time of execution of the second function to the stored time that execution of the third-party codelet began; and
load the third-party codelet at a hook point of an application, wherein the codelet is configured to:
  determine, by the inserted checkpoints, a runtime of the third-party codelet; and
  terminate the third-party codelet in response to the runtime exceeding a threshold.

* * * * *